US009243558B2

(12) United States Patent
Samara-Rubio et al.

(10) Patent No.: US 9,243,558 B2
(45) Date of Patent: Jan. 26, 2016

(54) COMPRESSED AIR ENERGY STORAGE

(75) Inventors: Dean Samara-Rubio, San Jose, CA (US); Elizabeth Samara-Rubio, San Jose, CA (US); Harold Ackler, Sunnyvale, CA (US); Robert Moffat, Los Altos, CA (US)

(73) Assignee: StorWatts, Inc., San Jose, CA (US)

(*) Notice: Subject to any disclaimer, the term of this patent is extended or adjusted under 35 U.S.C. 154(b) by 853 days.

(21) Appl. No.: 13/419,101

(22) Filed: Mar. 13, 2012

(65) Prior Publication Data

US 2013/0240068 A1 Sep. 19, 2013

(51) Int. Cl.
| | |
|---|---|
| F15B 1/00 | (2006.01) |
| F02C 6/16 | (2006.01) |
| F15B 1/24 | (2006.01) |
| F15B 11/072 | (2006.01) |
| H02J 15/00 | (2006.01) |

(52) U.S. Cl.
CPC ... *F02C 6/16* (2013.01); *F15B 1/24* (2013.01); *F15B 11/0725* (2013.01); *H02J 15/006* (2013.01); *F15B 2201/205* (2013.01); *F15B 2201/21* (2013.01); *F15B 2201/31* (2013.01); *F15B 2201/3152* (2013.01); *F15B 2201/405* (2013.01); *F15B 2201/4053* (2013.01); *F15B 2201/42* (2013.01); *F15B 2211/20515* (2013.01); *F15B 2211/20569* (2013.01); *F15B 2211/212* (2013.01); *Y02E 60/15* (2013.01); *Y10T 137/3115* (2015.04); *Y10T 137/3124* (2015.04); *Y10T 137/474* (2015.04); *Y10T 137/4857* (2015.04); *Y10T 137/86187* (2015.04)

(58) Field of Classification Search
CPC ... F15B 2201/3152; Y02E 60/15; F02C 6/16; Y10T 137/4857; Y10T 137/3115; Y10T 137/3124; Y10T 137/3118; Y10T 137/474
USPC ............ 137/206, 207, 208, 259, 266; 138/30; 60/659; 220/530, 720, 721, 723
See application file for complete search history.

(56) References Cited

U.S. PATENT DOCUMENTS

| | | | | |
|---|---|---|---|---|
| 2,401,792 | A | * 6/1946 | Overbeke | ........................ 138/30 |
| RE24,223 | E | 9/1956 | Ford et al. | |
| 4,177,837 | A | 12/1979 | Frank et al. | |
| 4,281,256 | A | 7/1981 | Ahrens et al. | |
| 4,364,416 | A | * 12/1982 | Jacobellis et al. | .............. 138/30 |
| 4,382,748 | A | 5/1983 | Vanderlaan et al. | |
| 4,916,916 | A | 4/1990 | Fischer et al. | |

(Continued)

FOREIGN PATENT DOCUMENTS

| | | |
|---|---|---|
| DE | 102007016131 A1 | 10/2008 |
| WO | WO-2008/139267 A1 | 11/2008 |
| WO | WO-2013/138473 A2 | 9/2013 |

OTHER PUBLICATIONS

"International Application Serial No. PCT/US2013/030911, International Preliminary Report on Patentability mailed Sep. 25, 2014", 12 pgs.

(Continued)

*Primary Examiner* — Atif Chaudry
(74) *Attorney, Agent, or Firm* — Schwegman Lundberg & Woessner, P.A.

(57) ABSTRACT

Certain examples present an improved compressed-air energy storage system. The system can include multiple sequential stages, in which accumulators are charged with air, which influences a hydraulic fluid to influence a pump/motor, and vice versa.

11 Claims, 32 Drawing Sheets

(56) References Cited

U.S. PATENT DOCUMENTS

| | | |
|---|---|---|
| 6,206,656 B1 | 3/2001 | Bailey et al. |
| 7,107,767 B2 | 9/2006 | Frazer et al. |
| 7,874,155 B2 | 1/2011 | McBride et al. |
| 7,900,444 B1 | 3/2011 | McBride et al. |
| 7,958,731 B2 | 6/2011 | McBride et al. |
| 8,037,678 B2 | 10/2011 | McBride et al. |
| 8,046,990 B2 | 11/2011 | Bollinger et al. |
| 8,225,606 B2 | 7/2012 | McBride et al. |
| 2001/0020453 A1 | 9/2001 | Bailey et al. |
| 2007/0258834 A1* | 11/2007 | Froloff et al. ............ 417/364 |
| 2008/0047271 A1 | 2/2008 | Ingersoll |
| 2008/0211230 A1 | 9/2008 | Gurin |
| 2008/0314467 A1 | 12/2008 | Gray, Jr. |
| 2009/0008173 A1 | 1/2009 | Hall et al. |
| 2009/0301089 A1 | 12/2009 | Bollinger |
| 2010/0229544 A1 | 9/2010 | Bollinger et al. |
| 2010/0307156 A1 | 12/2010 | Bollinger et al. |
| 2011/0056368 A1 | 3/2011 | Mcbride et al. |
| 2011/0079140 A1 | 4/2011 | Baseley |
| 2011/0138797 A1 | 6/2011 | Bollinger et al. |
| 2011/0258996 A1 | 10/2011 | Ingersoll et al. |
| 2011/0258999 A1 | 10/2011 | Ingersoll et al. |
| 2012/0042643 A1 | 2/2012 | Lebas et al. |

OTHER PUBLICATIONS

"International Application Serial No. PCT/US2013/030911, Response filed Jul. 26, 2013 to Invitation to Pay Additional Fees mailed Jun. 26, 2013", 1 pg.

"International Application Serial No. PCT/US2013/030911, International Search Report mailed Sep. 20, 2013", 6 pgs.

"International Application Serial No. PCT/US2013/030911, Invitation to Pay Additional Fees and Partial Search Report mailed Jun. 26, 2013", 6 pgs.

"International Application Serial No. PCT/US2013/030911, Written Opinion mailed Sep. 20, 2013", 10 pgs.

* cited by examiner

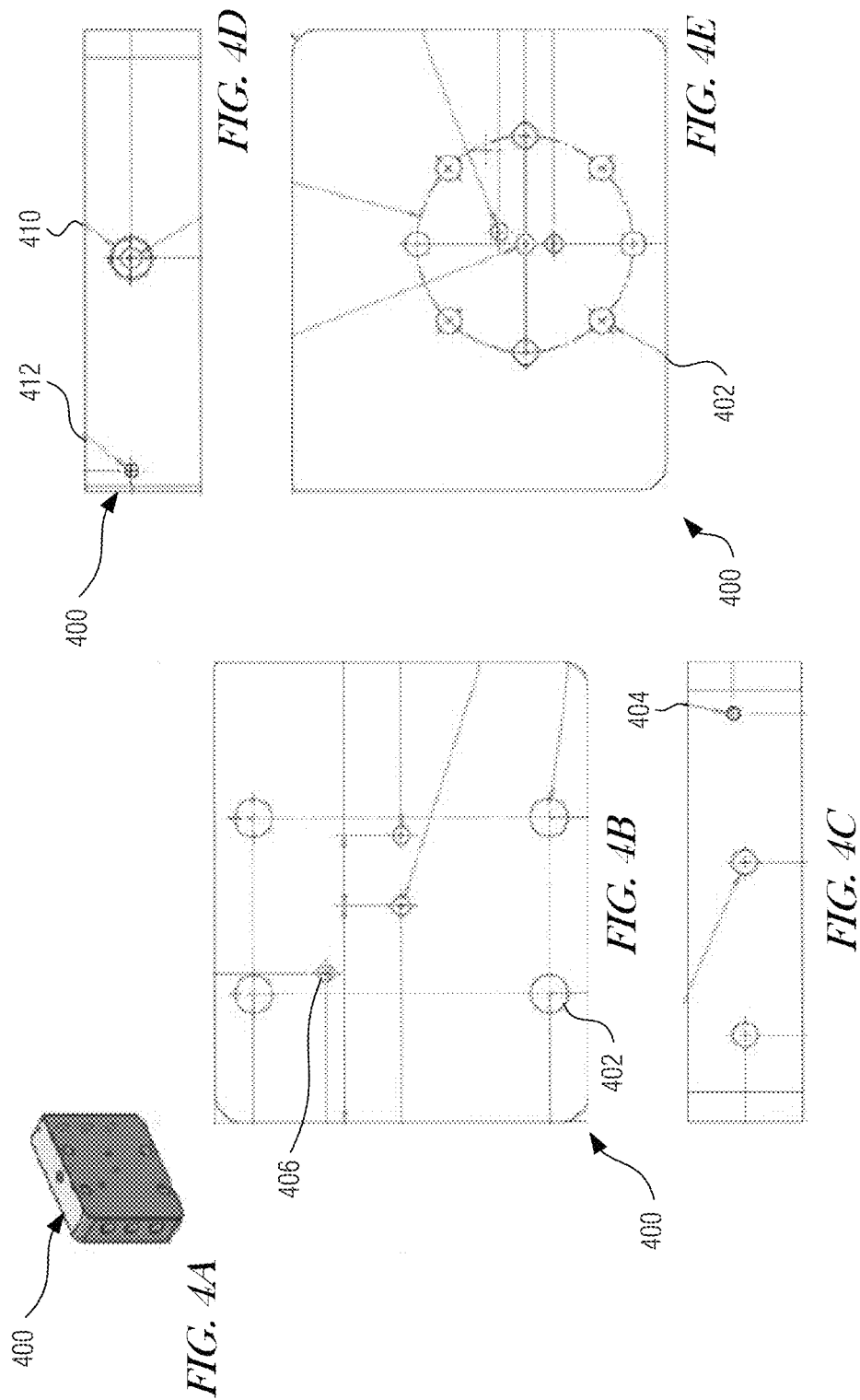

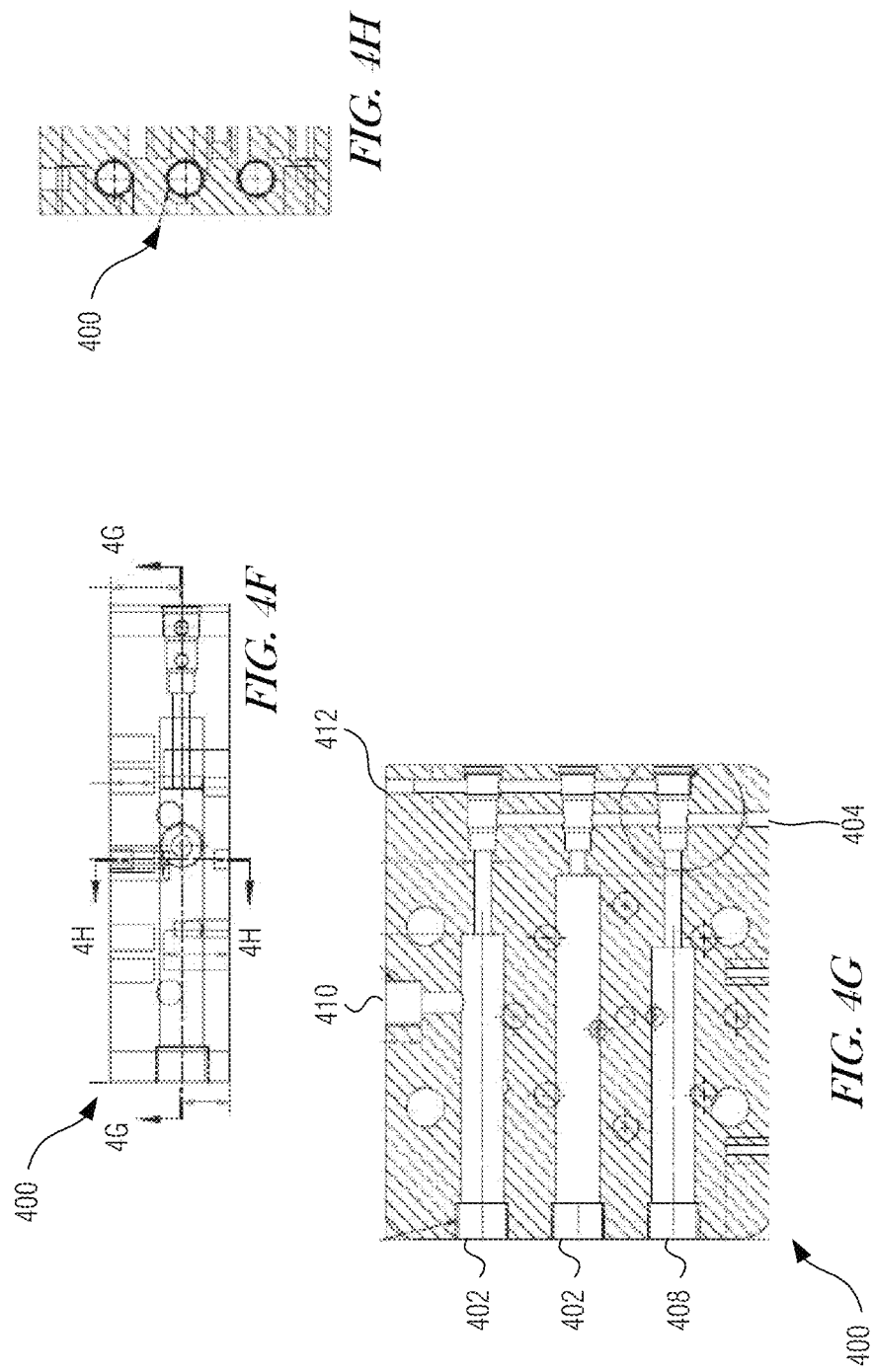

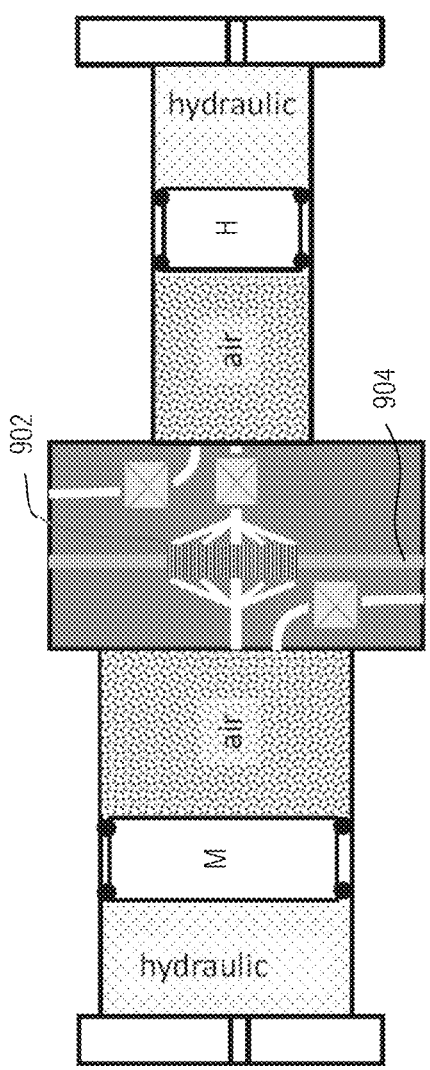
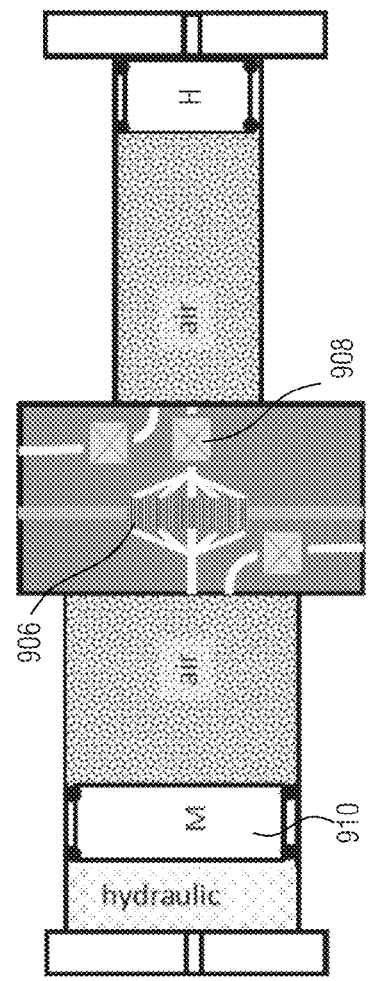
FIG. 9A
FIG. 9B

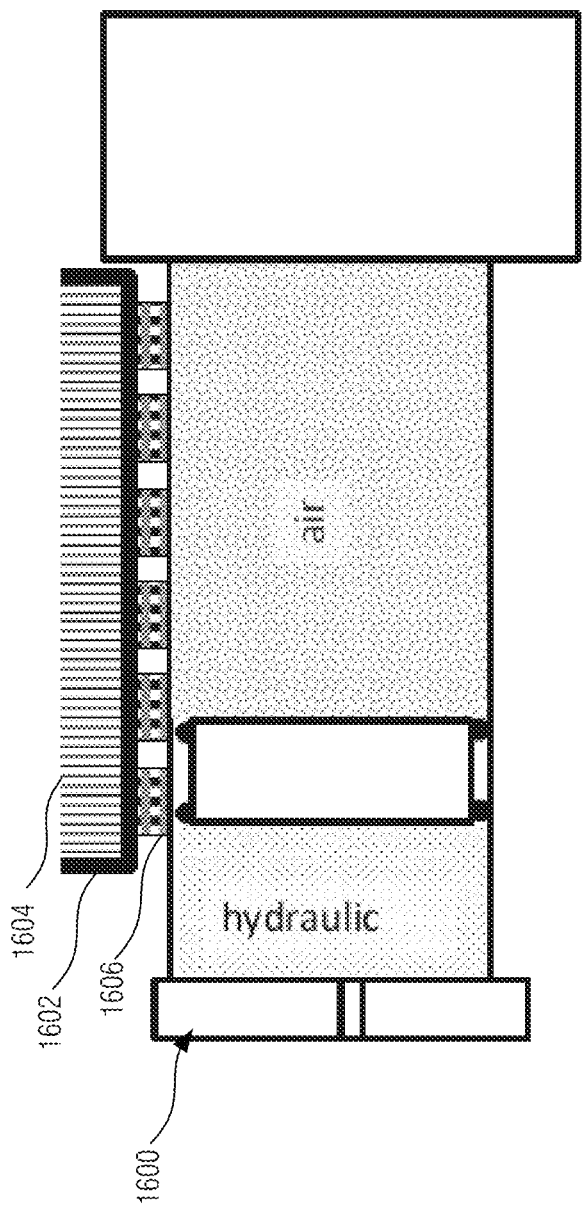

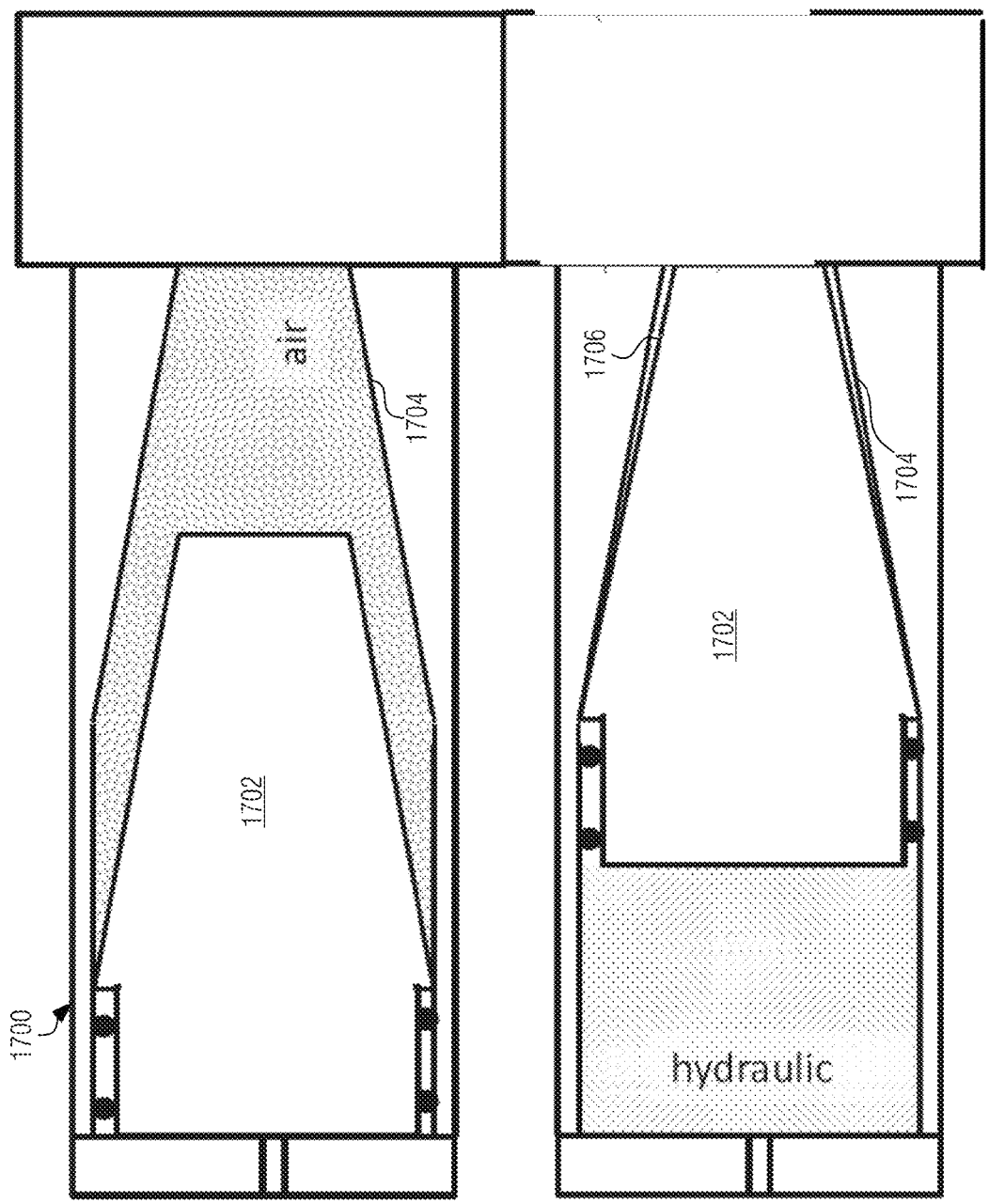

COMPRESSED AIR ENERGY STORAGE

BACKGROUND

Compressed-air energy storage (CAES) has been used in the past as a back-up power source to provide power in the event of the failure of some other power system. These systems have been developed for large-scale operations that operate at power levels in the range of megawatts and thus have an energy capacity of many megawatt-hours.

Unfortunately these large centralized energy storage applications are not appropriate and cannot be utilized where there is not both a well-established mature electricity transmission and distribution infrastructure and sufficient electricity generation capacity. These large-scale solutions also may require an operations and maintenance staff and may suffer from durability problems if left unattended, especially in geographic regions where grid electricity is not available at least 99% of the time. As such, their use is not wide-spread. And yet, for billions of people worldwide, including many of those in growing economies with persistent demands for increased power availability, there remains a lack of electricity distribution infrastructure (power lines, etc.) and/or a lack of power generation capacity to supply the necessary electricity. For these populations, CAES solutions at the right scale and designed for durability and autonomous operation in their environment would be highly beneficial to improve the consistency and availability of electricity service.

Growing populations depend on electricity storage and local fuel-based generation. Current solutions rely undesirably on lead acid batteries and diesel generators. Lead-acid batteries have limitations that can make them costly elements of power systems. For example, lead acid batteries can be fragile and have short life expectancy especially in warm climates. Diesel generators can require a network of people, equipment, and other operational expenses to effectively keep them running on a daily basis.

OVERVIEW

For more than 3 billion people, access to affordable and clean energy lies at the distributed scale. Nearly three billion people live in areas where the electrical grid is unreliable or unavailable. In these markets, rising energy demand is driving investment in new energy solutions. The challenge is to bring to market energy solutions that are affordable, reliable, and appropriate for these markets. Inappropriate and unreliable energy systems that rely on stifling, dirty diesel fuel and lead-acid batteries cannot be financed or effectively used, which translates into an inability to cost-effectively deliver consistent and reliable energy service.

Examples disclosed herein can provide communities and businesses the energy to grow. The presently disclosed compressed-air energy storage can transform distributed electricity storage from an expensive, logistical, and environmental burden into a growth accelerant for emerging markets. The examples disclosed herein provide CAES that is robust, modular and economical. They provide around-the-clock power for vital commercial, communications, vaccine cold chain, healthcare, education, and agriculture applications, while eliminating hazardous materials and reducing the TCO for off-grid systems by more than 45%.

Certain examples present a CAES that includes multiple sequential stages, in which accumulators can be charged with a gas such as air. The gas can influence a hydraulic fluid to influence a pump/motor, and vice versa. Examples address a number of shortcomings that affect prior attempts, including, but not limited to, the undesirable reliance on an adiabatic process, the undesirable reliance closed systems, the undesirable reliance on excessive fluid storage capacity, and undesirable reliance on spray-mixing of air and liquid to stabilize system thermal operation Certain examples present an improved cellular accumulator. Some examples include an integrated heat exchanger. Examples address a number of shortcomings that affect in prior attempts, including, but not limited to, undesirable heat exchange, undesirable fatigue wear and excessive package size.

Certain examples present an improved accumulator including a mandrel. Some examples include an integrated heat exchanger. Examples address a number of shortcomings that affect in prior attempts, including, but not limited to, undesirable heat exchange, undesirable fatigue wear and excessive package size.

BRIEF DESCRIPTION OF THE DRAWINGS

The drawings illustrate generally, by way of example, various embodiments discussed in the present document. The drawings are for illustrative purposes only and may not be to scale.

FIG. 4A is a perspective view of a manifold, according to an example.

FIG. 4B is a front view of a manifold, according to an example.

FIG. 4C is a bottom view of a manifold, according to an example.

FIG. 4D is a top view of a manifold, according to an example.

FIG. 4E is a back view of a manifold, according to an example.

FIG. 4F is a top view of a manifold, showing passages with hidden lines, according to an example.

FIG. 4G is cross section of 4E taken along line 4G-4G.

FIG. 4H is cross section of 4E taken along line 4H-4H.

FIG. 9A is a schematic of a manifold coupling a first accumulator and a second accumulator, with an internal heat exchanger, such as a gas-to-liquid heat exchanger, according to an example.

FIG. 9B is a schematic of a manifold coupling a first accumulator and a second accumulator, with an internal heat exchanger, such as a gas-to-liquid heat exchanger, according to an example.

FIG. 16 is a schematic of an accumulator showing an external heat-exchanger, according to an example.

FIG. 17A is schematic of an accumulator includes a frusto-conical piston, according to an example.

FIG. 17B is a schematic of the piston of 17A at a different stroke position.

DETAILED DESCRIPTION

Compressed-air energy storage (CAES) can be used to improve how energy sources and loads connect to electricity grids and allow a much greater fraction of energy demands to be met by renewable energy sources (which are intermittent and weather-dependent) while keeping overall power consistency and CAES can provide more users around the world with energy storage options. In various implementations, CAES can reduce harmful emissions. Electric pumps and motors, powered by renewable resources, can be used to compress air and/or power loads using stored compressed-air. These motor/pumps can be powered with clean sources, such as electricity derived from wind or solar power. CAES can use air as a working fluid, reducing harmful effects from leakage. CAES can have a long cycle-life, at least because tanks are robust and can store energy for long periods of time. CAES reduce operating costs, at least because working fluids can be taken from the environment. The present subject matter provides these and other benefits.

Figure 1:
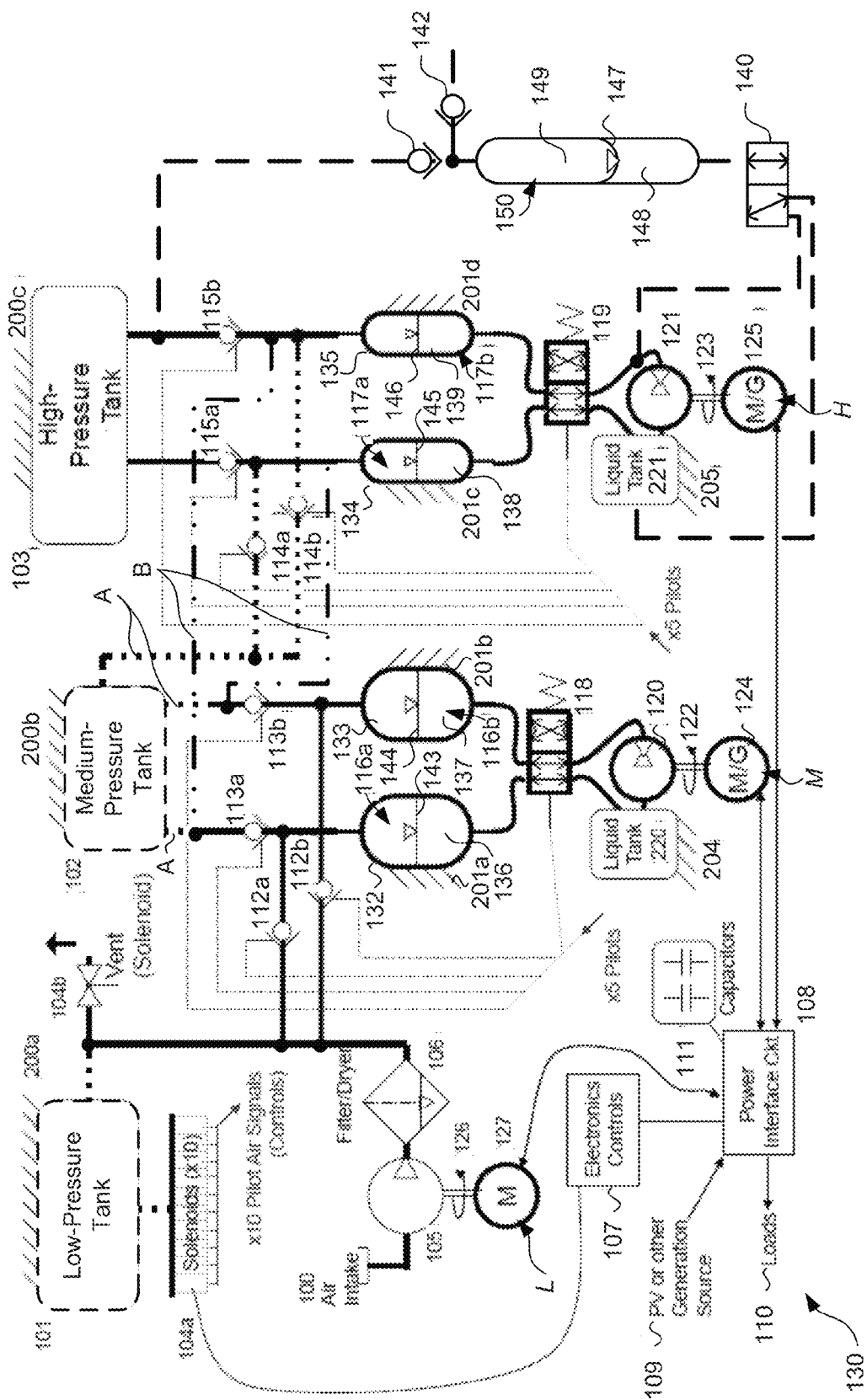
FIG. 1 is a schematic of a compressed-air energy storage system, according to an example.

FIG. 1 is a schematic of a compressed-air energy storage system 190, according to an example. The present subject matter compresses a gas such as air or another lower-bulk-modulus fluid to store energy. Energy is released by releasing the air from storage to do work, such as to move or flex a movable partition such as a piston or diaphragm inside an accumulator. The air can move another higher-bulk-modulus fluid, such as a hydraulic fluid, to turn a motor. The present subject matter is compatible with closed systems, in which air is neither added nor subtracted from the system in use, and open systems, in which air is added or ejected from the system in use.

The system 130 can have multiple stages, L, M and H. As illustrated, certain examples have three stages in which one or both of compression and expansion takes place, although examples with fewer or more stages are contemplated. An example can include an air intake 100. The air intake 100 can draw air from the atmosphere surrounding the system 130, or from some other source, such as a supply tank. The air intake 100 can be in fluid communication with a compressor 105. The compressor 105 can be of an open displacement or closed displacement design. An electromagnetic device such as a motor 127 can be coupled to the compressor 105 to actuate the compressor 105. The electromagnetic device 127 can be electric, hydraulic, or otherwise actuated, such as via an engine. The electromagnetic device 127 can be coupled to the compressor via shaft drive or some other drive.

The compressor 105 can be in fluid communication with a low-pressure tank 101. The compressor 105 can be in fluid communication with the low-pressure tank 101 via a filter and/or dryer 106. In some examples, a valve such as a solenoid valve or pop-off valve is coupled between the low-pressure air tank 101 and the compressor 105. Air can be stored in the fir low-pressure tank at around 90 pounds per square inch (psi), or 6.2 bar, but the present subject matter is not so limited.

The compressor 105 can be in fluid communication with a low-side 132 of a first accumulator 116a. The first accumulator 116a can include a low-side 132 sealingly separated from a high-side 136 with a movable partition 143 such as a slideable piston, membrane or bladder. Communication between the compressor 105 and the first accumulator 116a can include a valve 112a such as a check valve.

The compressor 105 can be in fluid communication with a low-side 133 of a second accumulator 116b. The second accumulator 116b can include a low-side 133 sealingly separated from a high-side 137 with a movable partition 144 such as a piston, membrane or bladder. Such communication can include a valve 112b such as a check valve or another valve.

Valves as referenced herein can be controllable, such as by solenoid or hydraulic pilot signal. The valves 112a and 112b can be electrically controllable, such as to direct fluid from the compressor 105 to one of the accumulators 116a and 116b.

In an "A" configuration, indicated by dotted lines, the compressor 105 can optionally be in fluid communication with a medium-pressure tank 102. The medium-pressure tank 102 can be coupled with the compressor 105 downstream of the valve 112a. The medium-pressure tank 102 can be in fluid communication with the low-side 132 of the first accumulator 116a downstream of the valve 112a. Communication between the low-side 132 of the first accumulator 116a and the medium-pressure tank 102 can be via a valve 113a, such as a check valve or electrically controllable solenoid. The medium-pressure tank 102 can be in fluid communication with the low-side 133 of the second accumulator 116b downstream of the valve 112b. Communication between the low-side 133 of the second accumulator 116b and the medium-pressure tank 102 can be via a valve 113b, such as a check valve or electrically controllable solenoid. In an example, air is stored in the medium-pressure tank 102 at around 540 psi, or 37.3 bar, although the present subject matter is not so limited. In a "B" configuration, indicated by phantom lines, the medium-pressure tank can be omitted. "A" and "B" supply lines can be used in conjunction.

In an "A" configuration, a high-pressure tank 103 can be coupled downstream of the medium-pressure tank. A valve 114a can control a first circuit that extends to the low-side 134 of a third accumulator 117a. The third accumulator 117a can include a low-side 134 sealingly separated from a high-side 138 with a movable partition 145 such as a piston, membrane or bladder. A valve 114b can control another circuit, in fluid communication with the first circuit, that extends to the low-side 135 of a fourth accumulator 117b. The fourth accumulator 117b can include a low-side 135 sealingly separated from a high-side 139 with a movable partition 146 such as a piston, membrane or bladder.

In a "B" configuration, the low-side 134 of the third accumulator 117a can be coupled downstream of the valve 113a, as is the high-pressure tank (e.g., via valve 115a). The low-side 134 of the fourth accumulator 117b can coupled downstream of the valve 113b, as is the high-pressure tank (e.g., via valve 115b). In an example, air is stored in the high-pressure tank 103 at around 3240 psi, or 223.4 bar, although the present subject matter is not so limited. The high-pressure tank 103 can occupy 2-3 cubic feet.

In an example, the system 130 is configured in multiple stages to improve the thermodynamic efficiency of the process of storing energy in the tanks 101, 102 and 103, as referenced below.

During a compression process, one or more stages can be driven by an electrical power source, such as a photovoltaic array, biomass-driven generator, a municipal power source, windmill, hydropower, or other forms of primary energy that can be converted to AC or DC electricity. Power can be managed and distributed to one or more of the electromagnetic devices. Electromagnetic devices can be rotary or linear in design. In one embodiment, rotary electromagnetic devices 124, 125, and 127 (e.g., motor/generators) move the rotating shafts 122, and 123 and 126, respectively. In addition it is possible to directly couple the rotating shaft to a primary energy source which outputs rotational mechanical energy such as a water-driven or wind-driven wheel. Shaft 126 can be coupled to an air compressor 105 such as a high-volumetric-flow low-pressure air compressor. Shaft 122 can be coupled to a motor/pump 120, such as a medium-volumetric-flow medium-pressure hydraulic pump, which can be connected between the high-side 136 of the first accumulator and the high-side 137 of the second accumulator. The motor/pump 120 can draw a higher bulk modulus fluid, such as hydraulic fluid, from a reservoir, such as reservoir 220. The connection can be reversed, such as by actuation of a valve 118 such as a shuttle valve, to toggle the motor/pump 120 into a motor mode. Similarly, a second motor/pump 121, such as a low-volumetric-flow, high-pressure hydraulic motor/pump can be toggled between a pumping operational state and a motoring operational state. The motor/pump 121 can draw hydraulic fluid from a reservoir, such as reservoir 221. The reservoirs 220 or 221 can be closed reservoirs, i.e. they can be sealed from the atmosphere.

Independent electric motor/generators and hydraulic motor/pumps for each stage can be beneficial in that they can reduce or eliminate a need to synchronize timing between stages. In examples in which only one motor/pump is used, the single motor/pump can be switched between stages instead of using two motor/pumps 120, 121. Accordingly, examples are included in which a single motor/pump is in selective fluid communication with the first hydraulic fluid 136, the second hydraulic fluid 137, the third hydraulic fluid 138 and the fourth hydraulic fluid 139, with at least one valve coupled between the first motor/pump and each of the first hydraulic fluid, second hydraulic fluid, third hydraulic fluid, and fourth hydraulic fluid, the at least one valve configured to switch between a first operational mode, in which the motor/pump is in fluid communication with at least one of the first hydraulic fluid and the second hydraulic fluid, and a second operational mode, in which the motor/pump is in fluid communication with at least one of the third hydraulic fluid and the fourth hydraulic fluid.

The air compressor 105 can be constructed using any of a number of designs including, but not limited to, scroll-type compressor such as those suitable for use in a high-efficiency air-conditioning system. Motor/pumps 120 and 121 can be constructed from a range of available technologies including pump such as a piston pump, such as a piston pump driven by a variable speed source such as a variable speed motor generator. Examples can use one or more bent-axis fixed radial piston motor/pumps, swash-adjustable piston motor/pumps, gear motor/pumps, and radial piston motor/pumps.

The timing and direction of the flow through any one of the fluid conduits coupling components of the system 130, illustrated as lines, can be controlled with valves, including, but not limited to, valves 118 and 119, which can be hydraulic valves. The conduit referenced herein can be adapted for heat-exchange with a heat source. A first valve 118 can be coupled between the first motor/pump 120 and the first hydraulic fluid 136 and between the first motor/pump and the second hydraulic fluid 137. The valve can be configured in a first operational mode to place a motor/pump outlet in fluid communication with the first hydraulic fluid 136 and a motor/pump inlet in fluid communication with the second hydraulic fluid 137, and in a second operational mode to place the motor/pump inlet in fluid communication with the first hydraulic fluid 137 and the motor/pump outlet in fluid communication with the second hydraulic fluid 136.

One or more controllers 107 can operate one or more of the valves 104b, 112a, 112b, 113a, 113b, 114a, 114b, 115a, and 115b, which can be pneumatic. Valves can be controlled by pilot signals from one or more solenoids, such as solenoids in an array 104a. The one or more arrays 104a can draw fluid under pressure from the low-pressure tank 101 or another source of pressurized fluid.

Hydraulic fluid can be pushed and/or pulled through the system 130 in each of the compression/expansion cycles. Hydraulic fluid can be pushed from 116a by air pressure from the tank 101. Hydraulic fluid can be pushed into 116b by the motor/pump 120. Motor/pump 120 can push air that was in 116b into the middle-pressure tank 102, as referenced above.

In an example, concurrent to fluid being pushed into the middle-pressure tank 102, hydraulic fluid can be pushed from 117a by air pressure from tank 102. Hydraulic fluid can be pushed into 117b by the motor/pump 121. Motor/pump 121 can push air from 117b into the high-pressure tank 103, as referenced above.

With controlled synchronization, tanks 101 and 102 are not needed to pressurize high-pressure tank 103. An additional accumulator 150 can be in fluid communication with the high pressure tank 103 via a communication circuit that can optionally includes valve 141. Valve 142 can optionally vent air to atmosphere. The accumulator 150 can include a low-side 149, which is in communication with the high pressure tank 103, and a high-side 148, with a moveable partition 147 disposed between them. A valve 140 can control whether the high-side 148 of the accumulator 150 is in fluid communication with an inlet or outlet of a motor/pump 121, or vice versa in the case of the motor/pump functioning as a motor.

Accordingly, energy can be released from one or more of the tanks 101, 102 and 103 through one or more expansion cycles that can rotate one or more corresponding shafts 126, 122 and 123. One or more motor/pumps 120 and 121 can act as hydraulic motors. Electromagnetic devices 124 and 125 can act as electrical generators. In some examples, fluid at an output of the valves 112a and 112b can be released to atmosphere, such as through valve 104b.

In some examples, the tank pressures and ratio of pressures between one tank and another vary continuously as the system is operated. In an example, the pressure ratio of a downstream tank (e.g., 102 or 103) to an upstream tank (e.g., 101 or 102) can increase during a compression mode of operation. The pressure ratio of a downstream tank (e.g., 102 or 103) to an upstream tank (e.g., 101 or 102) can decrease during an expansion mode of operation.

As a gas is compressed, it tends to heat, and as it expands it tends to cool. As fluid is compressed from atmospheric pressure, i.e. 14.7 psi, to 3000 psi, it can rise in temperature by more than 1400 degrees Fahrenheit. If heat is not exchanged with the environment, or is exchanged in small amounts, the process is referred to as being adiabatic. To improve the efficiency of a compression process the process can be divided into stages. In an example, heat can be exchanged from a working fluid between stages in which the fluid is worked. These include stages that pump the fluid, in which the fluid turns a motor, and stages in which the fluid is stored in, or released from, a tank.

Heat exchange apparatus 200a and 200b, for example fins and/or other heat-exchangers, can transfer heat to or from a fluid. In addition to inter-stage heat exchange, intra-stage heat exchange can be used to improve efficiency. Intra-stage heat exchange can provide an improvement in stage efficiency for stages with compression/expansion ratios greater than about 2.5.

According to various examples, intra-stage heat exchange can distinguish an adiabatic process from a polytropic process. In an example, when intra-stage heat exchange is improved or maximized, and a gas has its temperature held close to the ambient temperature most or all of the times it is used in a process, the process approaches an isothermal process. In an example, with a stage pressure ratio of 3:1, either in compression or expansion, an intra-stage heat exchange effective to control temperature of a process so that it is substantially isothermal can improve the stage efficiency by as much as 25% versus an adiabatic stage. In an example, devices that substantially participate in the intra-stage heat exchange include heat exchangers 201a, 201b, 201c, 201d, 204, and 205. The elements 201a, 201b, 201c, 201d can exchange heat into or out of a respective accumulator, according to several examples.

Heat exchangers 204 and 205 can exchange heat with a fluid such as a fluid from the high-side of an accumulator as it flows through hydraulic reservoirs, 220 and 221, during a cycle. As pressure increases, the flow rate of the fluid can decrease for a given power throughput and thus the heat exchange rate via elements 204 and 205 can decrease. Heat exchangers 201a, 201b, 201c, and 201d can compensate for reduced heat-exchange rate.

In an example, the system 130 can operate to produce around 1 kilowatt, The system 130 can store 3 kilowatt-hours, or more. If additional tanks are used, more energy can be stored. The system 130 can provide in excess of 40% round trip efficiency (RTE). Round trip efficiency includes the electricity yielded from storage divided by the electricity used at an earlier time to store the energy. In an example, RTE includes energy yielded from expander divided by energy used previously to drive the compressor. Output from the electromagnetic devices 124, 125 can be combined inside the electronics controller 107 through a power interface 108. The power interface can include DC/DC converters. The power interface can include storage capacitors 111, and can be in communication with photovoltaic sources 109. Loads 110 can draw power from the power interface circuit 108.

The present subject matter provides several benefits. A hydraulic fluid reservoir, such as reservoirs 220 and 221 can be an effective for dumping heat to ambient depending on the volume, materials, shape, mounting, and other design factors.

Hydraulic motor/pump has mechanical inefficiency internally due to friction of direct contact of moving parts as well as high-velocity moving parts in close proximity moving viscous fluids. Hydraulic motor-pump has volumetric inefficiency due to internal leakage between moving parts and partial backflow of fluid during cyclical operation. Hydraulic piping from a motor/pump to an accumulator has mechanical inefficiency that causes heating of the motor/pump body and the fluid as it passes through. The piping from the motor/pump to cylinders can be designed to effectively dump this heat to ambient before the fluid enters the cylinders.

Hydraulic fluid can enter an accumulator and can exchange heat with the walls of the accumulator. It can help to spread heat along the length of the accumulator and can be used to cool the manifolds (e.g., 528 in FIG. 5) and accumulators referenced herein provided that the fluid entering can be not already hotter than the average temperature therein.

Accumulator walls, and face surfaces of a manifold, can form the chamber within which the air pressure is increased. The air can be heated while surrounded by these surfaces. The time constant of temperature change of these surfaces can be longer than a single cycle and can be made longer by increasing the thermal mass.

The inner surface of the accumulator walls can be wetted by the in/out stroke of the piston partition. The amount of fluid that can be left in the film depends on the surface roughness, the type of fluid (hydroscopic/hydrophobic) and surface material, the viscosity of the fluid, etc. This fluid can partially vaporize to increase the specific heat of the gas in the accumulator under the proper conditions. This vaporization can be effective at dampening the temperature rise manifold and tubing disclosed herein.

As a gas passes through the valves and passageways of the manifold between stages, incoming air from a compressor stage, such as the left-most stage, can be equalized with manifold temperature, e.g., as it travels through a manifold to an accumulator. Gas from accumulators 116a travelling to accumulator 117a can through a valve 113, which can be thermally tied to the temperature of a manifold in which it is disposed.

In some examples, as air exits a manifold on a high-pressure side of an accumulator, tubing immediately at the egress of the final valve can be quenched to ambient temperature, increasing the density of the air at the egress and help to reduce the effective pressure drop of the final valve.

Figure 2:
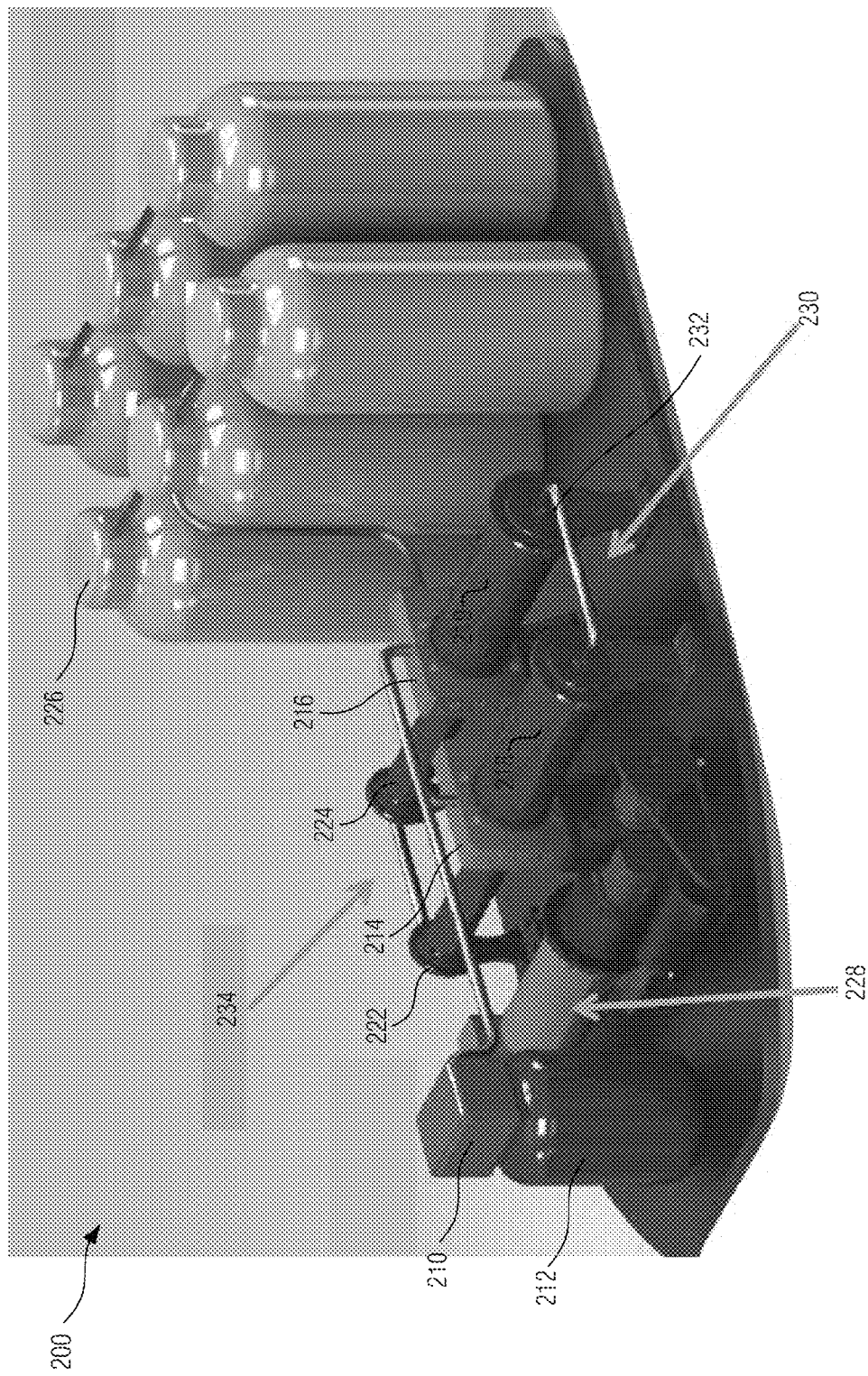
FIG. 2 is a perspective view of a compressed-air energy storage system, according to an example.

FIG. 2 is a perspective view of a compressed-air energy storage system, according to an example. The example shows a self-contained skid 200 that can be easily placed on a target site to store power and produce power when needed. At the grid-level, a number of skids can be deployed as needed to load balance the grid. Some of the components discussed with respect to FIG. 1 can be omitted from a skid.

In the example, a first compressor 210 is coupled to a first tank 212. The first compressor can compress air. The first compressor 210 can also be in fluid communication with a first manifold 214 and a second manifold 216. In an example, each of the manifolds can include one or more valves to repeated place the compressor 210 is communication with one or more of the low-pressure side, or low-side, of accumulators 218, 219, 222 and 224.

Within each accumulator can be a moveable partition separating a low-side from a high-side. In an example, the pressurizing a low-side forces the movable partition against a high-side of a plurality of accumulators. Hydraulic lines 232, 234 place the high-sides in communication with other equipment, such as one or more hydraulic valves and motor/pumps, not shown, which can be coupled between high-sides in order to influence the motor/pumps to act as motors providing torque converted from fluid pressure. One or more electric motors 228 can utilize one or more motor/pumps to pump and pressurizing one high-side of one or more accumulators. In an example, the motor/pump can pressurize a high-side of one of a pair of accumulators, while draining the other high-side.

In an example, a lower pressure stage 230 can interact with the compressor 210, with a higher pressure stage 234 being acted upon by the lower pressure stage, as disclosed above. Ultimately, one or more high-pressure tanks 226 can be pressurized, such as in parallel, storing energy or providing stored energy, as needed.

Figure 3:
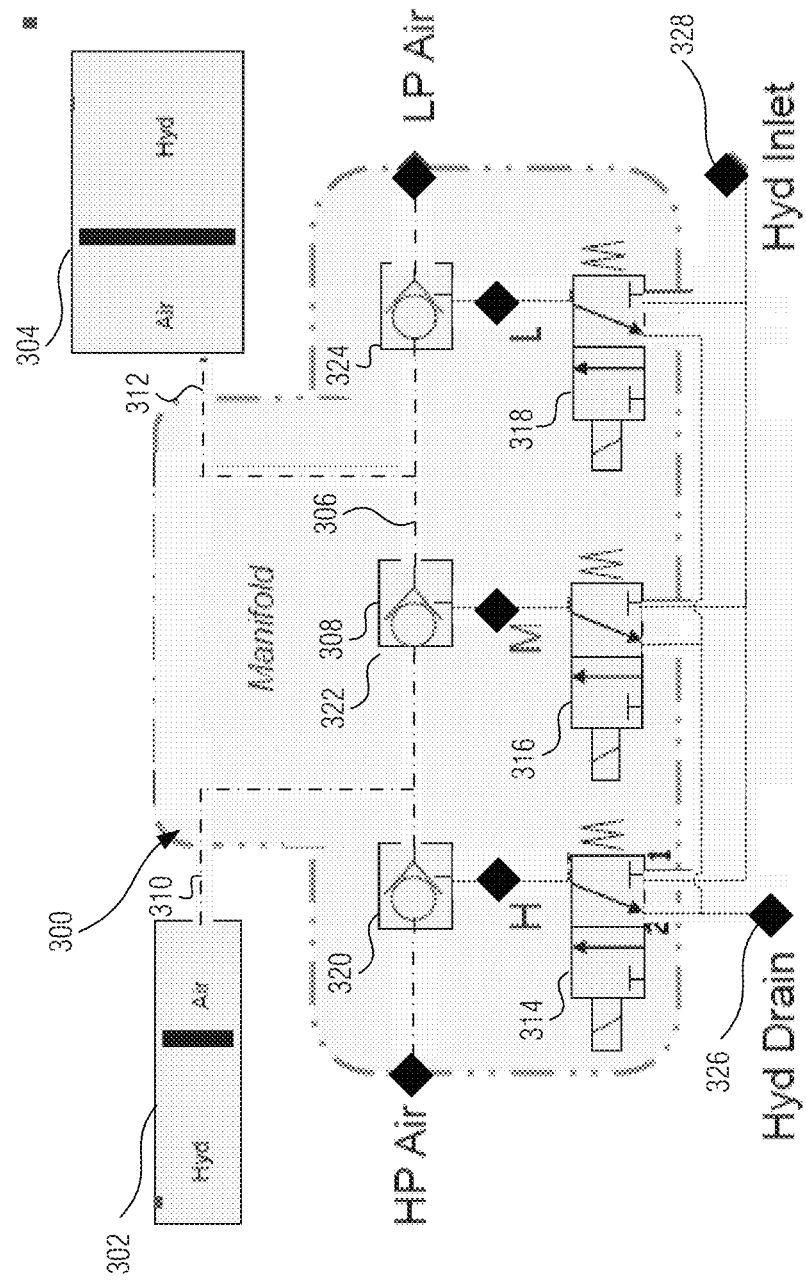
FIG. 3 is a schematic of a manifold, according to an example.

FIG. 3 is a schematic of a manifold 300, according to an example. In the schematic, ports into or out of the manifold are shown using a diamond, dash-dot-dash lines who air paths, and dot-dot-dot lines show hydraulic fluid. The manifold 300 can be coupled to each of a first accumulator 302 and second accumulator. In an example, the manifold 300 defines a passage 306 between air of the first accumulator and air of the second accumulator. In an example, a valve 308 places the two in selectively valved fluid communication with each other.

In an example, the manifold 300 defines a first movable partition port 310 in communication with the air of the first accumulator, and a second movable partition port 312 in communication with the air of the second accumulator. Fluid communication in the ports 310 can be valved.

In the manifold 300, three valves 314, 316, 318 can provide pilot signals to valves 320, 322 and 324, respectively. In this manner, the valves 314, 316 and 318 can control staging of pressure among multiple accumulators and storage tanks.

In an example, valve 324 can control whether the stage pictured receives lower-pressure ("LP") fluid. Valve 308 can be closed while air is pumped into the low-side of accumulator 304, then once it is pumped in, it can be opened, allowing the air from accumulator 304 to pressurize the air of accumulator 302. Finally, valve 320 can control whether air from accumulator 302 can be used to charge still further accumulators at higher-pressure ("HP"), such as the third accumulator 117a pictured in FIG. 1. Accordingly the sequential stages are labeled "L", "M" and "H", representing lower-pressure, a middle or intermediate-pressure, and higher-pressure of the air. A hydraulic circuit, including a drain 326 and an inlet 328 is also pictured. The hydraulic circuit can optionally be in communication with the "Hyd" fluid of accumulators 302 and 304, as discussed herein.

FIGS. 4A-H provides several views of a manifold 400, according to an example. The example shows one configuration suited to carry out the functions illustrated in FIG. 3. A number of sealed ports 402 are illustrated. These are used in manufacturing a valve block from billet. Other configuration can case ports, alleviating the need for seals. A hydraulic drain 404 is shown. This corresponds to 326 in FIG. 3. A low pressure port 406 is shown. This corresponds to "L" FIG. 3, and can be in fluid communication with a low-pressure tank. An HP Air port 408 is shown. This corresponds to "HP Air" in FIG. 3. An LP Air port 410 is shown. This corresponds to "LP Air" in FIG. 3. A hydraulic inlet 412 is shown. This corresponds to 328 in FIG. 3.

Figure 5:
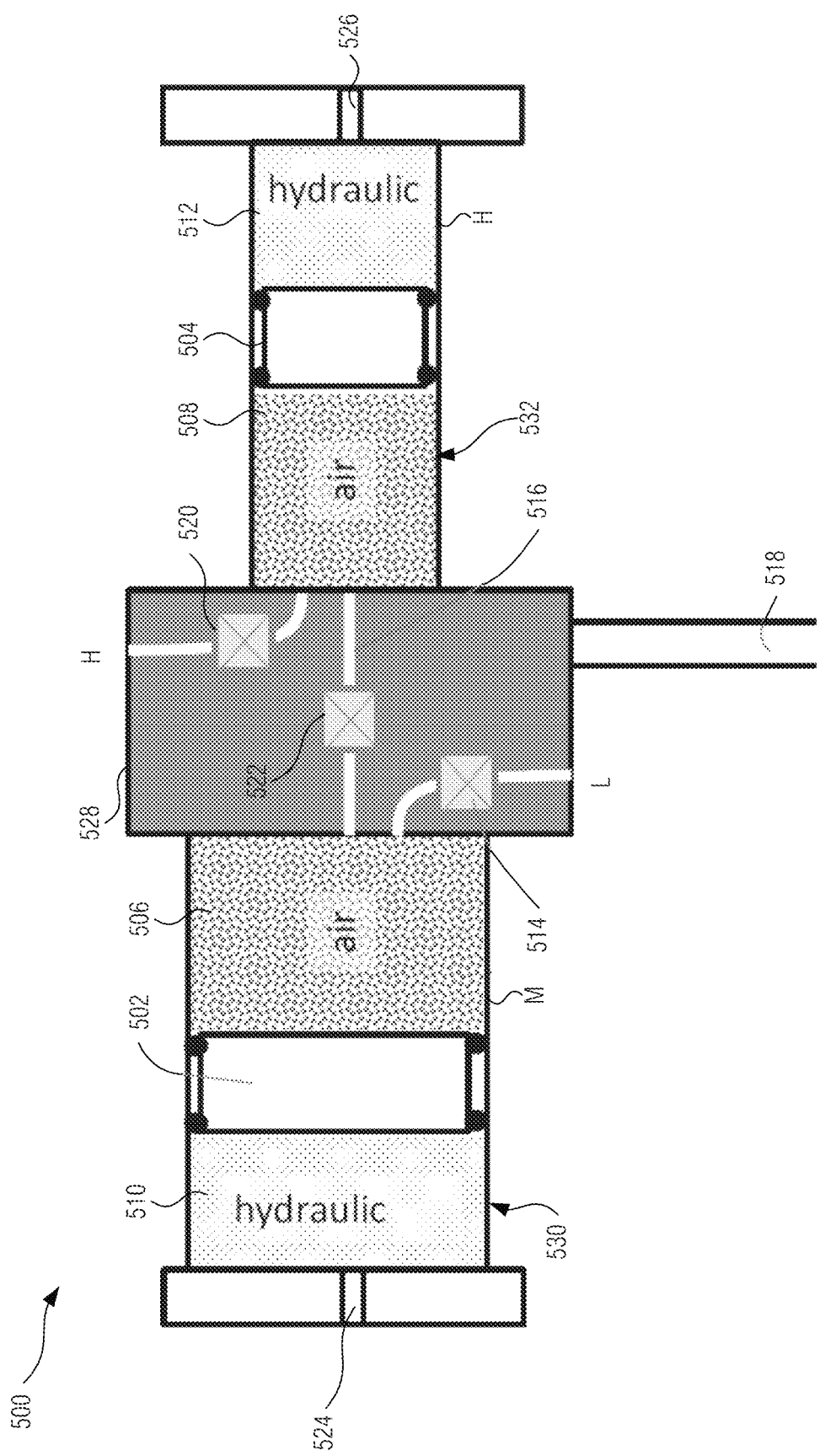
FIG. 5 is a schematic of a manifold, a first accumulator and a second accumulator, according to an example.

FIG. 5 is a schematic of a manifold system 500, a first accumulator and a second accumulator, according to an example. In an example, a manifold 528 couples a first accumulator 530 and a second accumulator 532. In an example, the accumulator 530 is accumulator 116a illustrated in FIG. 1, and accumulator 532 is accumulator 117a illustrated in FIG. 1. In the example, movable partitions 502 and 504 are slideable in housings of the accumulators 530 and 532. They can be sealed to the housings with o-rings, piston rings and the like. Other moveable partitions, as disclosed herein, are possible.

Valve 522 can selectively place air 506 in fluid communication with air 508. Ports 524 and 526 can place hydraulic fluid 510, 512 in fluid communication with a valve and/or motor/pump. An example of a motor/pump is shown as motor/pump 120 in FIG. 1. Valves 514 and 520 can selectively control staging of fluid from other systems to the illustrated system 500.

In compression mode, air can be drawn into Port L, and enter piston cylinder M via the manifold 528. The air can be forced into cylinder H propelled by hydraulic fluid and pass through the manifold 582 in-transit. Air can be forced from cylinder H to port H and thus to the high pressure storage vessel(s). In this way a 3-stage compression system can be achieved. During compression, the air can heat, and resists being compressed. During expansion, the air can cool, and resists being expanded. This temperature change in both directions leads to loss of efficiency and power. Thus, stabilization of temperature and dampening of temperature excursions of the air can be important for improving the system efficiency and power handling capability.

In a compression example, valve 514 opens to allow fluid communication with air 506. Valve 514 closes, and fluid 510 works the air 506 by moving the moveable partition 502 toward the air. Valve 522 can open to allow worked air 506 to work air 508. In an example, the valve 522 closes and the moveable partition 504 works the air 508. In an example, the valve 520 opens and releases the air 508, such as to a storage tank, e.g., high-pressure tank 103 illustrated in FIG. 1. In an example, a storage tank such as a medium-pressure tank can be in fluid communication with 514. Expansion, in which energy is produced, can occur by reversing the process. In an example, a mount 518 can provide a mechanical support.

Figure 6:
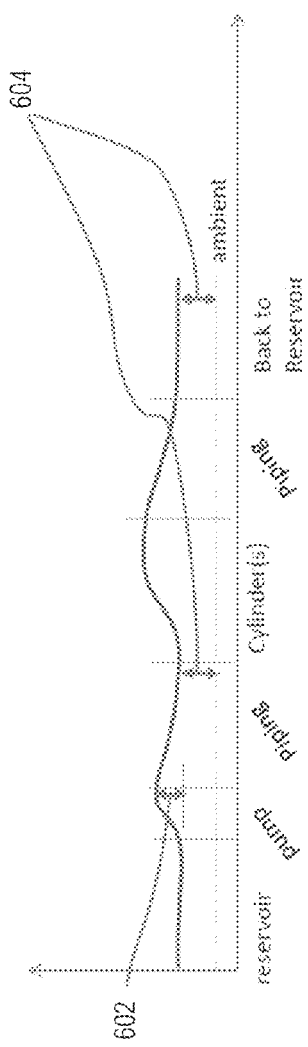
FIG. 6 shows exemplary data representing functional attributes of a hydraulic fluid such as hydraulic fluid, according to an example.

FIG. 6 show exemplary data representing functional attributes of a hydraulic fluid such as hydraulic fluid, according to an example. Because of the working on fluids the present system provides, the fluids are heated. To improve or maintain efficiency, the fluids can be temperature stabilized. The chart shows fluid temperature vertically and horizontally shows fluid temperatures at different stages of the compression (moving left to right). At 602, an efficient motor/pump can reduce temperature increases. At 604, heat exchange with the ambient can reduce temperature increases. Heat exchange apparatus discussed herein provide such a benefit.

Figure 7:
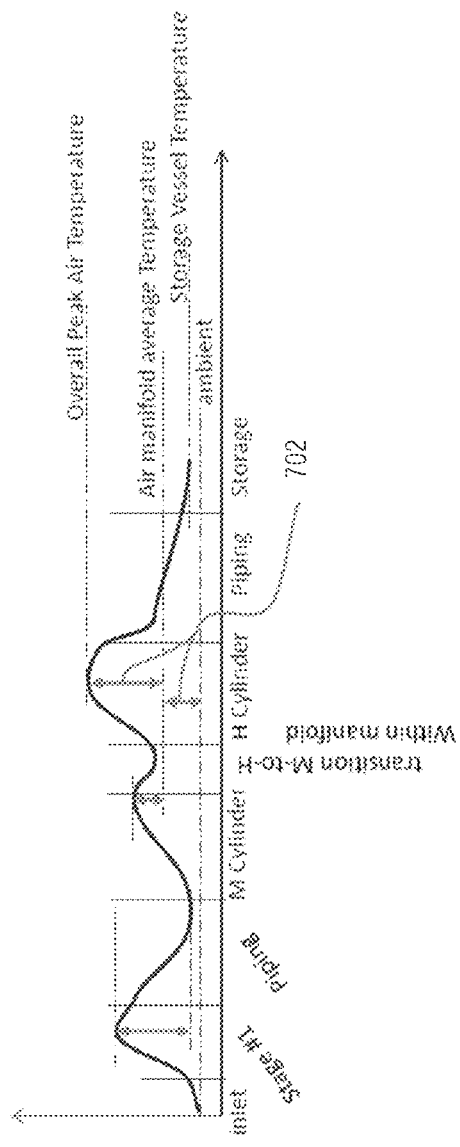
FIG. 7 shows exemplary data representing functional attributes of a gas, according to an example.

FIG. 7 show exemplary data representing functional attributes of a gas, according to an example. As with hydraulic fluids, heating takes place. To improve or maintain efficiency, the fluids can be temperature controlled. The chart shows fluid temperature vertically, and horizontally shows fluid temperatures at different stages of the compression (moving left to right). The vertical double-arrow portions 702 show heat increase that can be tempered by the heat-exchangers discussed herein.

Figure 8:
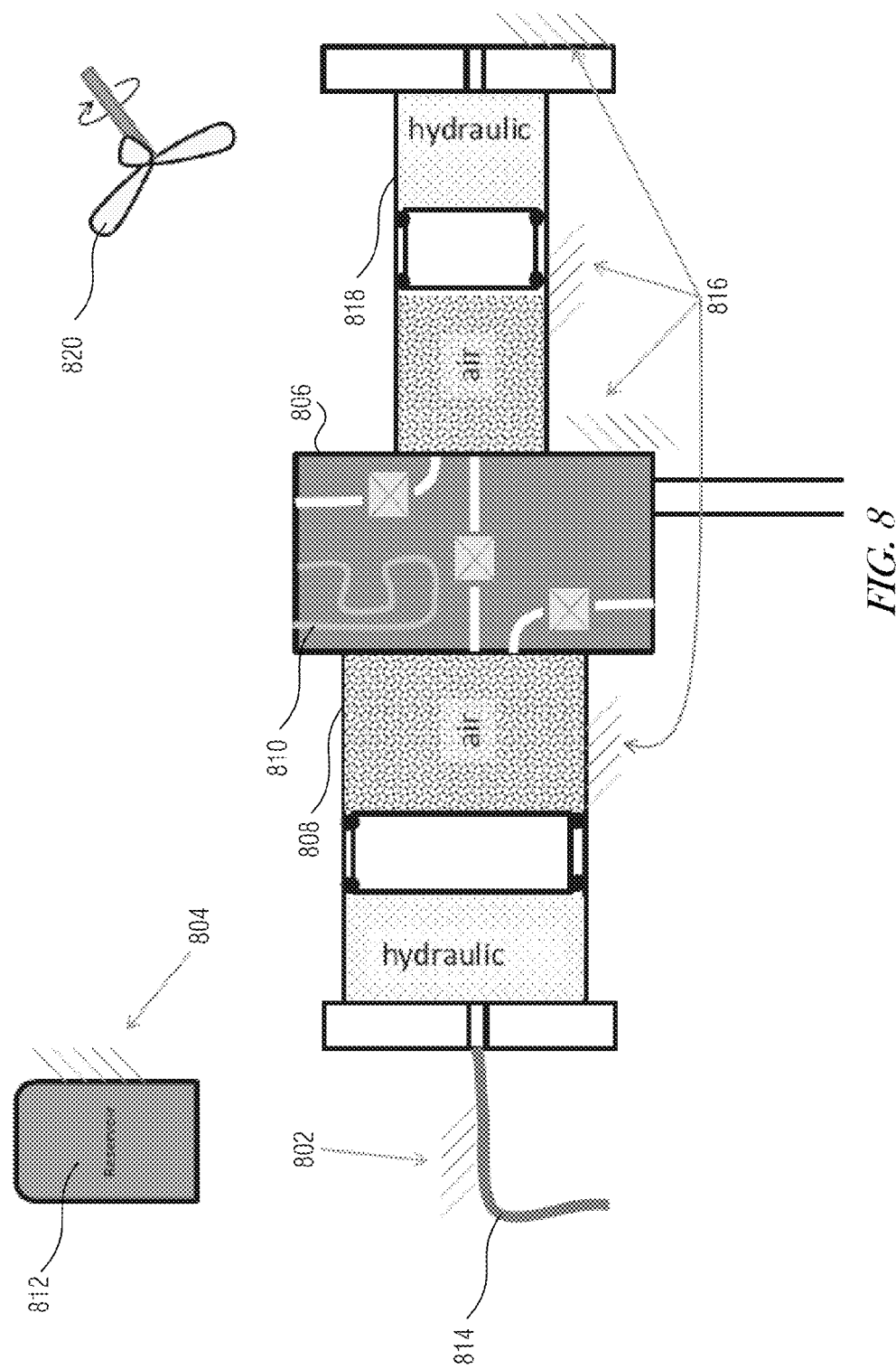
FIG. 8 is a schematic of a manifold coupling a first accumulator and a second accumulator, with external forced-air convection, according to an example.

FIG. 8 is a schematic of a manifold coupling a first accumulator and a second accumulator, with external forced-air convection, according to an example. In an example, the manifold 806 is liquid-cooled, defining a liquid cooling passage 810. The cooling passage 810 can be isolated from other passage and port of the first manifold 806. Some examples include cooling channels disposed through the manifold, sealed from the interior of a vessel 808.

Additional head-exchange devices can be used. A heat-exchanger 804 can be attached to a reservoir 812. A heat-exchanger 802 can be fastened to hydraulic conduit 814. A heat-exchanger 816 can be fastened to vessels 808 and 818. An agitator 820 can circulate fluid over one or more heat-exchangers.

FIG. 9A is a schematic of a manifold coupling a first accumulator and a second accumulator, with an internal heat exchanger, such as a gas-to-liquid heat exchanger 906, according to an example. An air to liquid heat exchanger 902 is coupled to the first passage. A cooling channel 904 can cool the heat-exchanger. FIG. 9B is a schematic of a manifold coupling a first accumulator and a second accumulator, with an internal heat exchanger, such as a gas-to-liquid heat exchanger, according to an example. The example shows heat distribution during mid-cylinder piston movement. In an example, work is done on the air as the first piston partition 910 moves from right to left. A valve 908 connecting the M and H cylinders is open and can allow the pressure to equalize throughout the connected volume of the M and H cylinders. The work done by piston movement can be distributed throughout, causing the gas to heat homogenously throughout the accumulator. As compression progresses, heated air can be pressed through the manifold, providing a location for heat-exchange via the heat-exchanger 906, which can be air-cooled or liquid-cooled. Air that has passed through to H cylinder can be reheated as further compression takes place.

Figure 10:
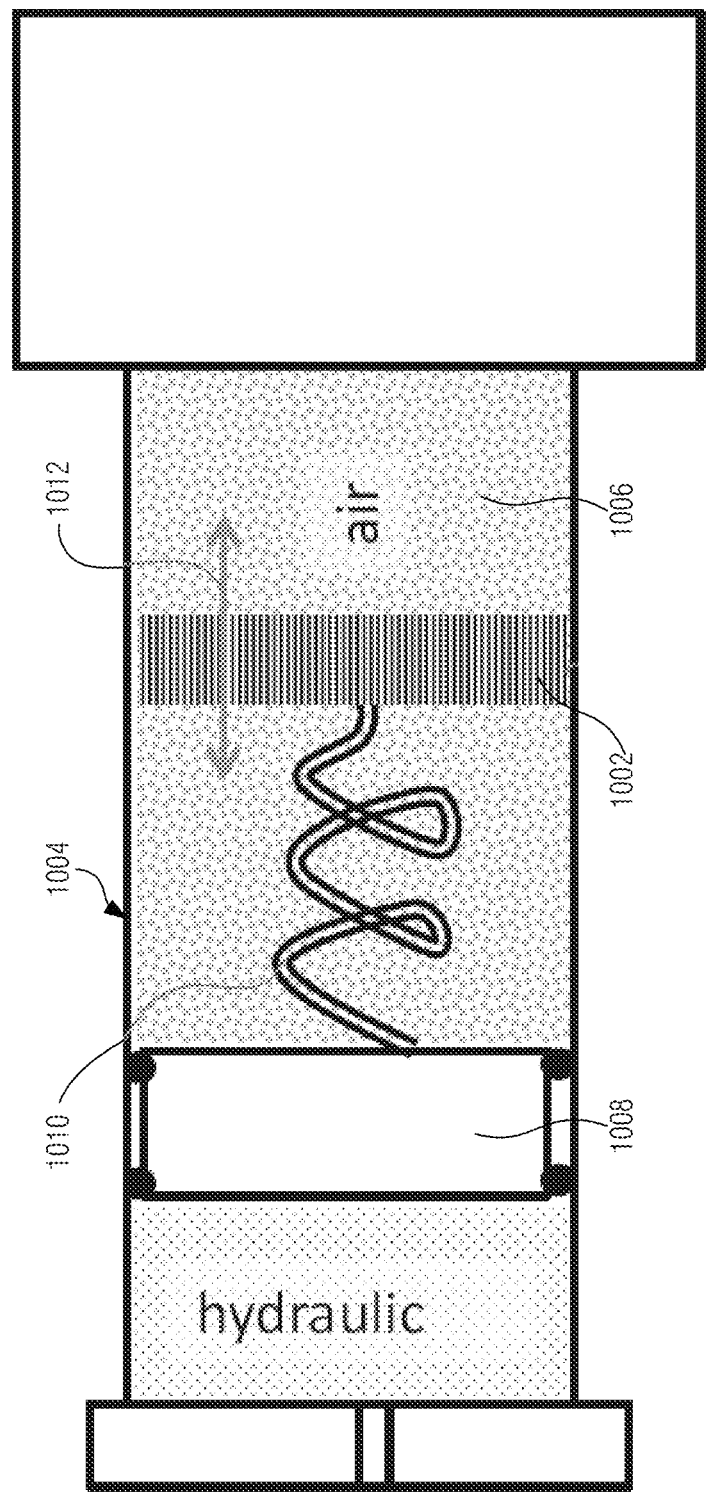
FIG. 10 is a schematic of an accumulator with a movable partition and a heat exchanger, according to an example.

FIG. 10 is a schematic of an accumulator with a movable partition and a heat exchanger, according to an example. A heat exchanger 1002 can be disposed in the accumulator 1004, and disposed inside the air 1006, in thermal communication with the movable partition 1008. An element 1010 can couple the heat exchanger 1002 with the moveable partition 1008. In an example, the element is thermally conductive. In some examples, the element 1010 is a spring. The spring can vibrate 1012 in close proximity to an interior wall of the accumulator 1004. The spring can scrape in close proximity to the interior wall of the accumulator.

Figure 11:
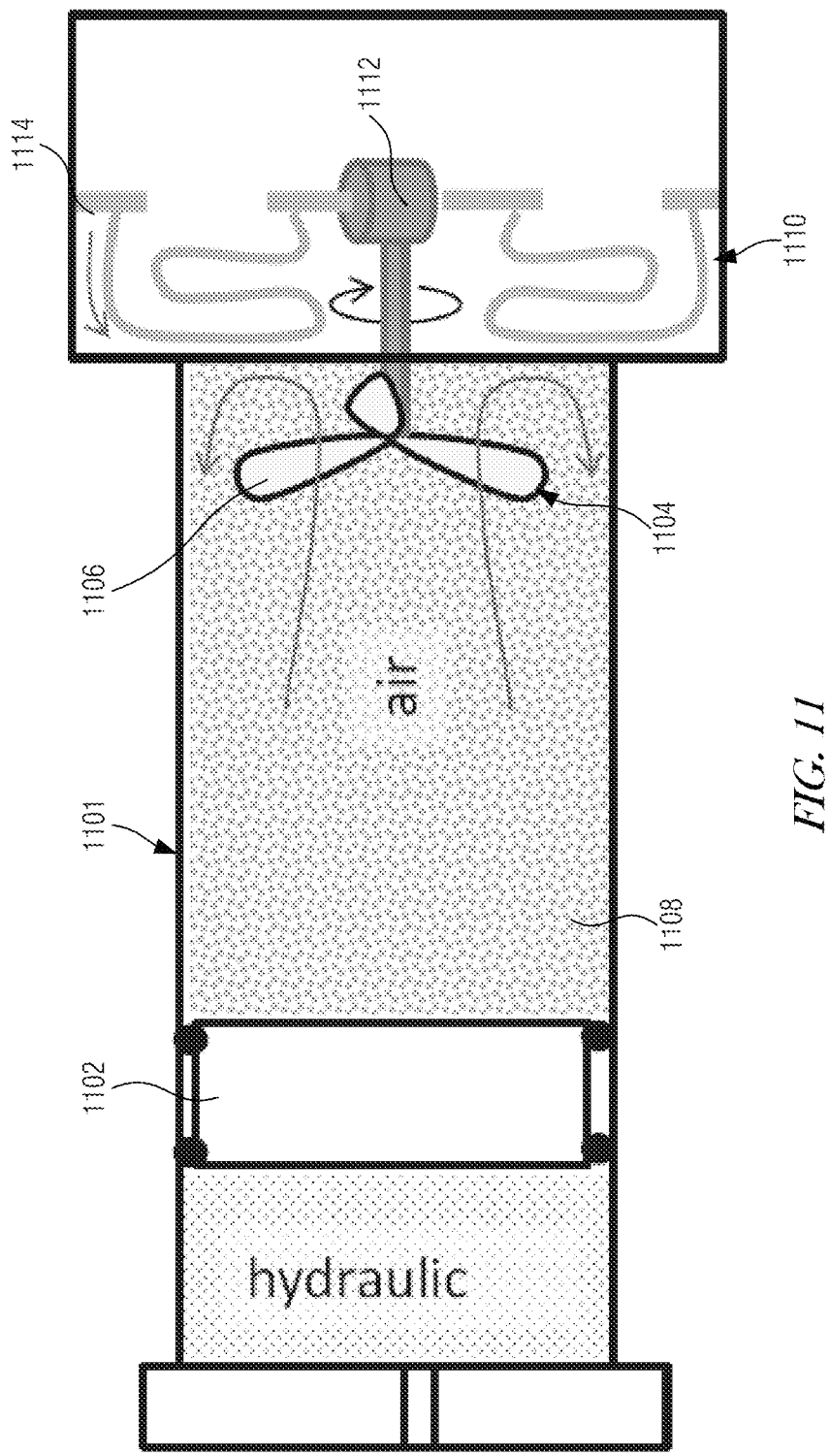
FIG. 11 is a schematic of an accumulator with a movable partition and a heat exchanger including a fluid-powered mixer with blades disposed inside the accumulator, according to an example.

FIG. 11 is a schematic of an accumulator 1101 with a movable partition 1102 and a heat exchanger including an agitator 1104, such as a mixer, such as a fluid-powered mixer, with blades 1106 disposed inside the accumulator 1101. Examples are included in which the agitator is a fan. The agitator 1104 can be disposed inside the accumulator, and disposed inside the air 1108. The agitator 1104 can agitate the air 1108 against a liquid-cooled manifold 1110. Examples are included in which the agitator 1104 is coupled to a fluid powered motor 1112 in fluid communication with a fluid 1114 of the liquid-cooled manifold 1110.

Figure 12:
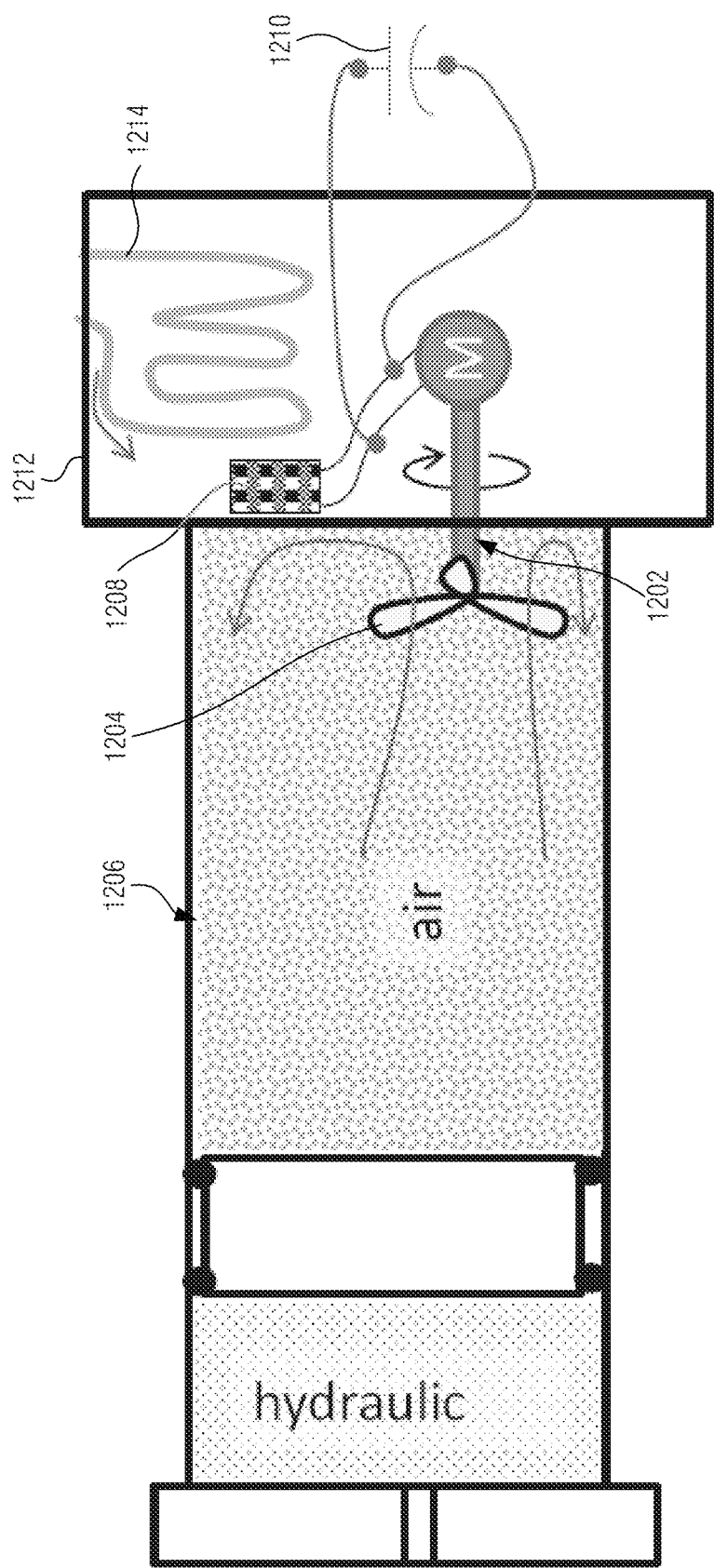
FIG. 12 is a schematic of an accumulator with a movable partition and a heat exchanger including an electric mixer with blades disposed inside the accumulator, according to an example.

FIG. 12 is a schematic of an accumulator with a movable partition and a heat exchanger including an agitator 1202, such as an electric mixer with blades 1204, disposed inside the accumulator 1206, according to an example. Some examples include a thermoelectric energy converter 1208 to harvest heat from the accumulator to power the agitator 1202. The thermoelectric energy converter 1208, such as a thermoelectric energy converter, can be coupled to the first manifold 1212 and can power the agitator 1202. Some examples include a power sink/source 1210 coupled to the thermoelectric energy converter 1208 to store energy of the thermoelectric energy converter 1208 and to power the agitator 1202. The power sink/source 1210 can be a capacitor. The power source 1210 can be a battery. The manifold 1212 can be liquid-cooled, such as through a liquid cooling passage 1214.

Figures 13, 14:
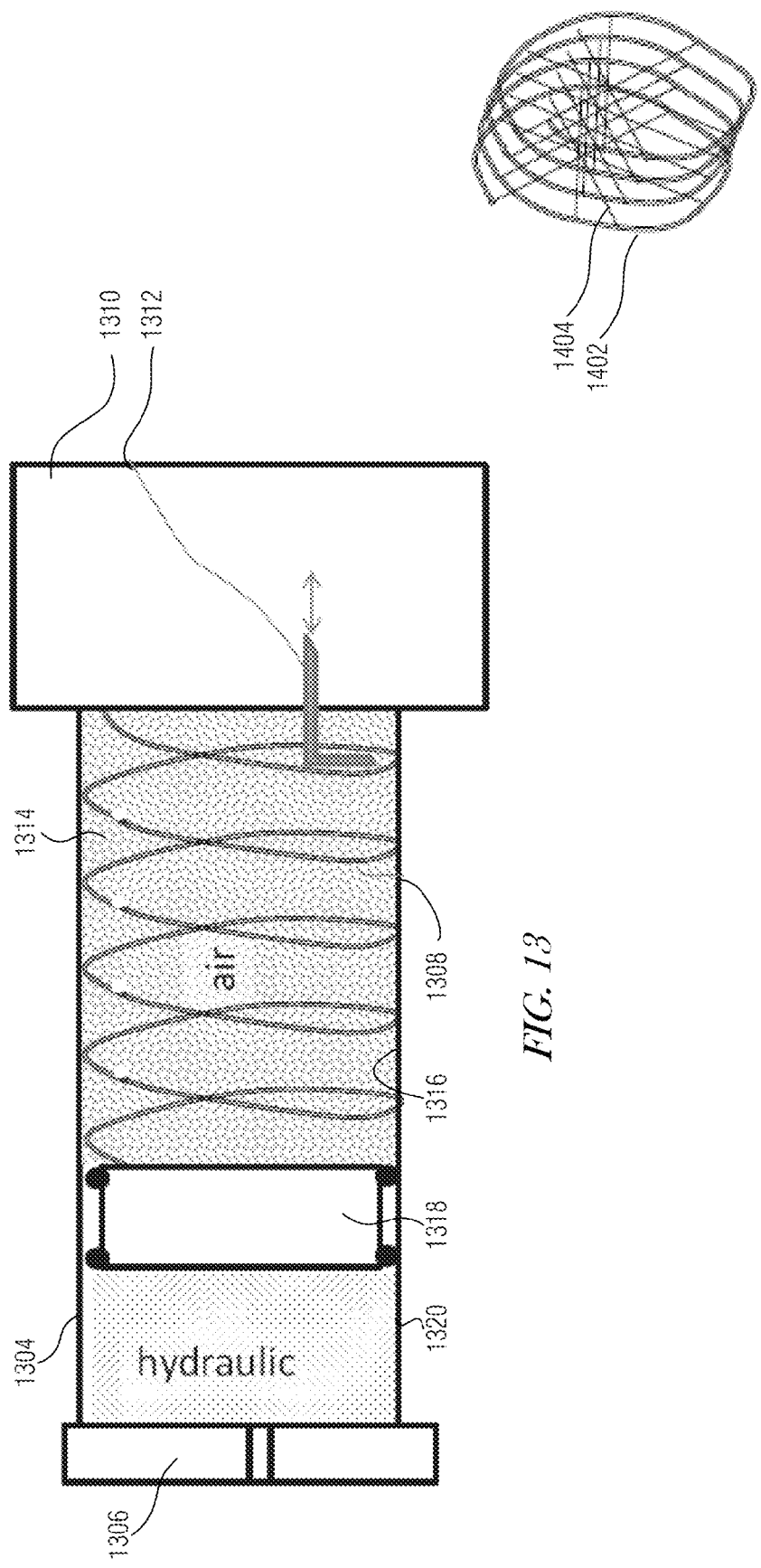
FIG. 13 is a schematic of an accumulator with a movable partition and an element disposed inside the accumulator, according to an example.
FIG. 14 is a schematic of an element, according to an example.

FIG. 13 is a schematic of an accumulator 1304 with a movable partition 1318 and an element 1308 disposed inside the accumulator, according to an example. An element 1308, such as a vibrating spring, can agitate or stir the air 1314, such as at the outer circumference 1316 of a vessel 1320 such as a cylinder. In an example, the element 1308 can disturb the boundary layer. Energy to excite the element 1308 can be from the motion of the moveable partition 1318 alone. Energy to excite the element 1308 can be provided by or supplemented by a plucking or vibrating element 1312 in the manifold. A vibrating element can be implemented mechanically, magnetically, with thermoelectric or with fluid-powered drive.

FIG. 14 is a schematic of an element including cross-threads, according to an example. The element 1402 is an example of the element 1308 in FIG. 13. The element 1402 can be in a spiral shape. The element 1402 can be in a coil. The element 1402 can have an optional web of threads 1404, one or more of which that can cross the diameter of the element to increase the interaction with the air in the center of the cylinder.

Proximity of the element 1402 to an interior surface of an accumulator can encourage air velocity at the surface to increase in boundary layer. The threads, 1404 can be designed to cause flow throughout such a volume. The walls of the tube can have a thin meniscus of hydraulic fluid such as hydraulic fluid residual, which can be from motion of a movable partition inside an accumulator, against the hydraulic fluid. The element 1402 can vibrate into this meniscus layer and atomize it, at least partially.

Figure 15B:
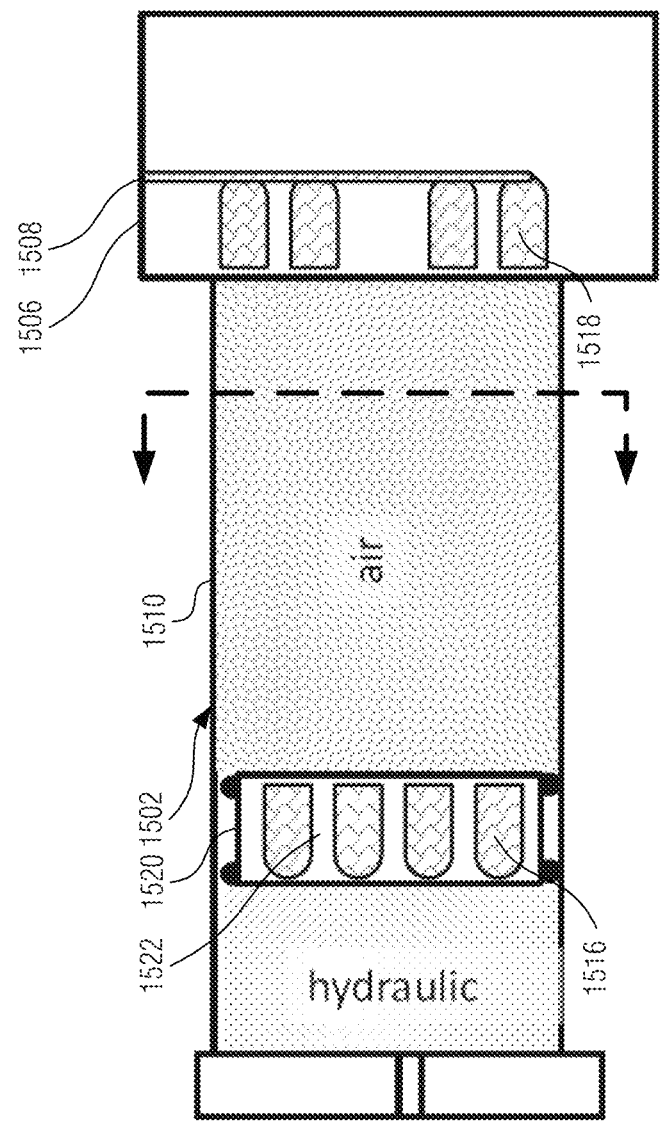
FIG. 15B is a schematic cross-section taken along line 15B-15B in FIG. 15A.
Figure 15A:
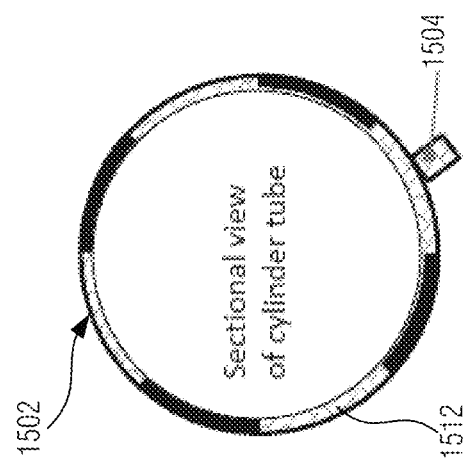
FIG. 15A is a cross-section taken at line 15A-15A in FIG. 15B, showing phase-change material disposed inside a double-walled housing, according to an example.

FIG. 15A is a cross-section taken at line 15A-15A in FIG. 15B, showing phase-change material disposed inside a double-walled housing, according to an example. FIG. 15B is a schematic cross-section taken along line 15B-15B in FIG. 15A. In an example, a vessel 1502 can be formed of a double-wall cylinder 1510 with one or more cavities 1512 for phase-change material. In an example, the phase-change material can absorb heat energy to changes, or attempts to change, phases of phase-change material disposed therein.

Cavities 1512 can be alternating, with supports 1522, such as solid metal supports, defining one or more thermal passageways. An optional fitting port 1504 can be coupled on the outside of the vessel 1502 and be used to pressure or exchange phase-change material with a cavity disposed therein. A moveable partition 1520 can have pockets 1516 in which phase-change material is disposed. A manifold 1506 can have pockets 1518 for phase-change material. A port 1508 can be used to flow phase-change material into and out of respective pockets.

A phase-change material can be used in a manner to hold the temperature of the fluid, such as air, close to the phase-change temperature of the fluid. The phase-change fluid can be held in a closed circuit. The phase-change fluid temperature can be set to a desired starting point at the beginning of each cycle. As a moveable portion such as a piston moves (e.g., to the right for compression), the phase-change material temperature can change (increase for compression) until it reaches the phase-change point at which time it can absorb heat without changing temperature.

The phase-change material can be solid/liquid, liquid/gas, or solid/gas (e.g., sublimation). Because the ambient temperature can change quite significantly over the lifetime of the system (and in daily and seasonal cycles), the tuning of the phase-change material phase-change temperature can be useful. Certain examples can regulate the pressure of the phase-change material to tune the temperature of phase-change. In some examples, the temperature of phase-change can be tuned by varying the composition of the phase-change material. Phase-change cooling vests can operate around 15 degree Celsius, comprising non-toxic oils and fats. Other chemistries are also contemplated.

Adjustment via changes to static pressure and mixture composition can influence the liquid/gas phase-change. The heat capacity, latent heat of the phase-change, the viscosity (e.g., when in liquid form), and thermal conductivity of the material in different phases can affect performance. The phase-change material can be positioned in such a way that it interacts with the air and the temperature can be re-established between cycles. In some examples, the phase-change material does not completely overbear other thermal pathways for temperature stabilization. The "re-set" temperature can be below the phase-change temperature for compression mode and above the phase-change temperature for expansion mode. The direction of phase-change can be different: e.g. solid-liquid for compression, and liquid-solid for expansion, or vice versa.

FIG. 16 is a schematic of an accumulator 1600 showing an external heat-exchanger 1602, according to an example. Some examples include cooling fins 1604. Some examples include a thermoelectric power exchanger 1606 coupled to the first accumulator. A thermoelectric energy converter 1606 can be driven by an electrical power source and can act as a bi-directional heat pump. In compression, the thermoelectric energy converter ("TEC") can be powered to cool the vessel or cylinder wall. The total amount of heat extracted from the outside of the system can increase and, as such, the overall background temperature of the system can increase. The TEC can lower the peak temperature of the air inside the system. In expansion, the TEC can pump heat from environment into the system and the waste heat can keep the overall system temperate at a selected temperature, which is at or near ambient temperature.

FIG. 17A is schematic of an accumulator includes a frusto-conical piston, according to an example. FIG. 17B is a schematic of the piston of 17A at a different stroke position. Examples are included in which a moveable partition 1702 includes a frustoconical piston. The accumulator 1700 can include a frustoconical recess 1704 sized and shaped to conform to receive and conform to the piston 1702. Examples are included in which a gap 1706 is defined between a recess 1704 and the piston 1702. The gap size can increase toward and end of the piston. Examples are included in which at least one of the frustoconical piston and the frustoconical recess is flexible. In an example, the flexible recess alleviates a need for a gap, by allowing for more even pressure distribution when mated with a piston.

The geometry can be arranged to improve or maximize the surface area/volume ratio as the volume is collapsed to zero or near zero. As the volume diminished, the velocity of the air being expelled can increase. This can occur in conjunction with its proximity to the surfaces provides the kinetic energy to disturb the barrier layer. The angles of the piston partition and the cylinder wall can be slightly different to leave a thin wedge of dead space (wider end of wedge towards the air manifold). This can encourage the piston partition not to bind or trap pockets of air (e.g. due to surface variations) that can be superheated creating noise, inefficiency and unnecessary stresses on components. A piston partition can be hollowed-out on the hydraulic side to reduce weight and material and/or improve overall heat transfer capability of the hydraulic media.

Figure 18:
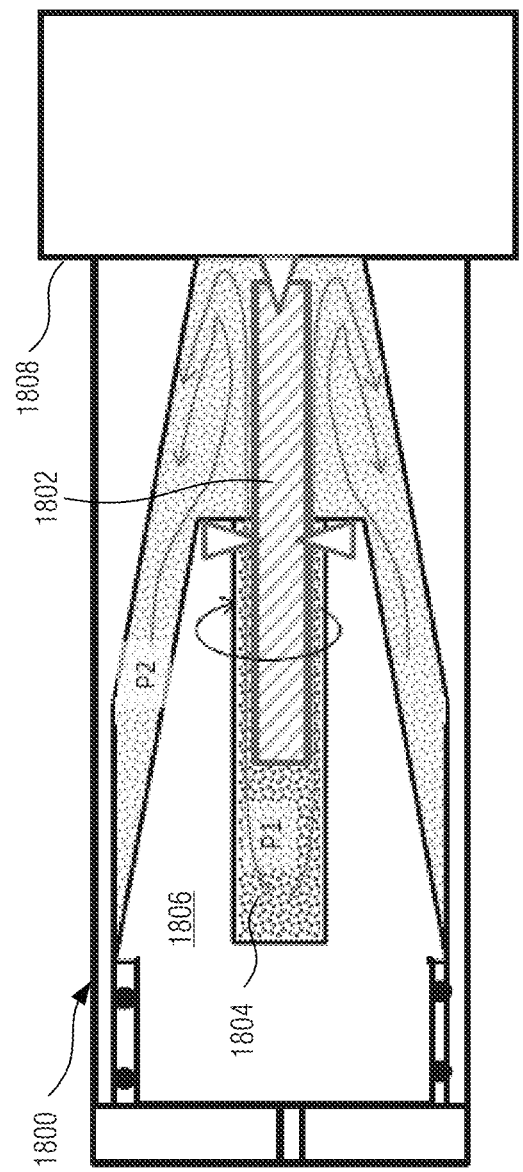
FIG. 18 is a schematic of a heat exchanging impellor disposed in a piston of an accumulator, according to an example.

FIG. 18 is a schematic of a heat exchanging impellor disposed in a piston of an accumulator, according to an example. Some examples include an impeller shaft 1802 coupled with and extending from a portion of the accumulator 1800, into a recess 1804 of the piston 1806. The recess 1804 can be sized to admit the impeller shaft 1802 throughout a desired piston stroke inside the accumulator. Examples are included in which the impeller shaft 1802 is configured to rotate. Examples are included in which the impeller shaft 1802 is configured to impel fluid out of the recess of the piston 1806.

The impellor 1802 can form a screw-like convection fan mounted into the piston 1806. The impellor 1802 can be supported at the face of the air manifold 1808 can not only of circulate the fluid but also to axially support the piston 1806 during travel. The rotational motion can be created in a number of different ways. In an example, rotational motion is takes advantage of a pressure difference that can build up as the piston partition moves. P1 can be greater than P2 during compression, driving rotation of the impellor 1802 and circulating the air as shown by the exemplary flow lines.

Figure 19:
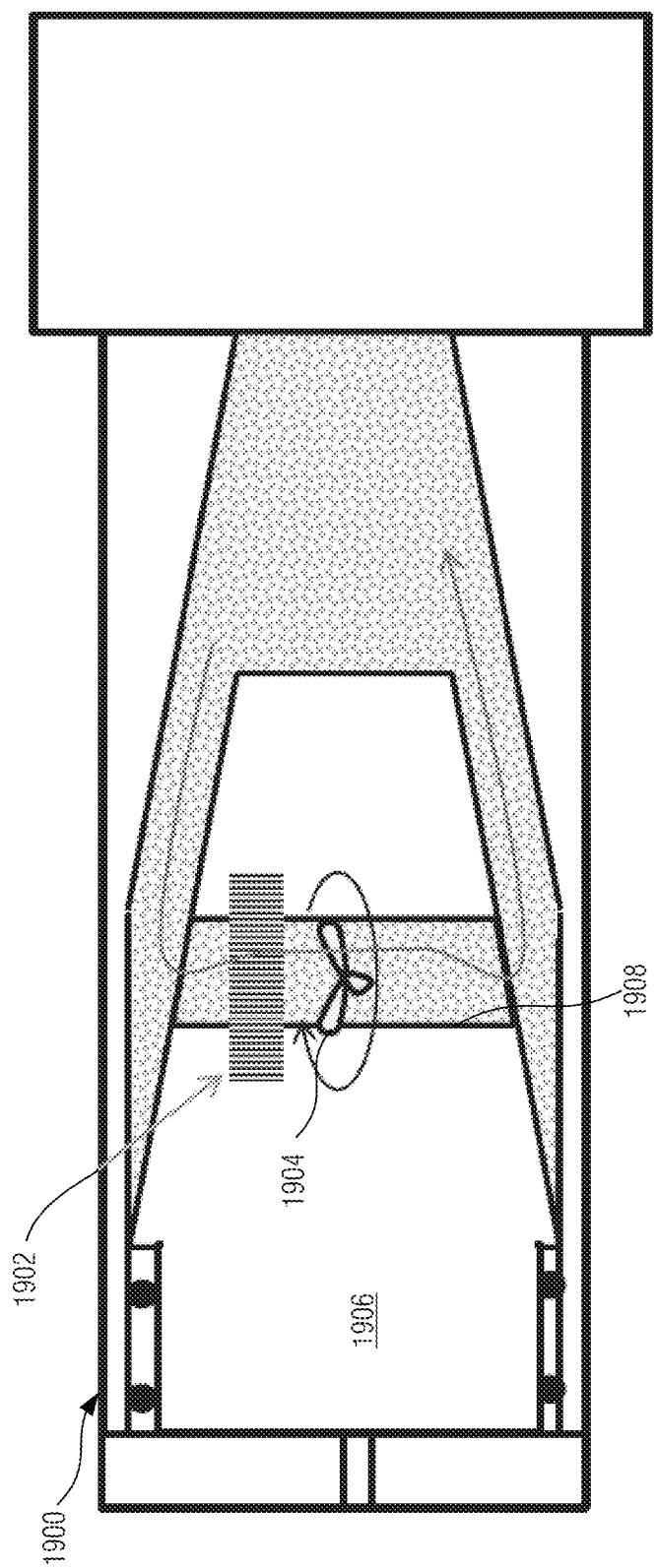
FIG. 19 is a schematic of a heat exchanger and agitator disposed cross-ways through a piston of an accumulator, according to an example.

FIG. 19 is a schematic of a heat exchanger 1902 and agitator 1904 disposed through a piston 1906 of an accumulator 1900, according to an example. A passage 1908 can extend cross-ways through the piston 1906. A heat exchanger 1902 can be disposed in the passage 1908. Some examples include an agitator 1904 to agitate the first gas across the piston heat exchanger 1902.

The agitator 1904 can cause strong air flow perpendicular to the direction of piston 1906 motion. The agitator 1904 can comprise a fan embedded into the piston 1906. Examples reduce or minimize the impact of dead volume in which heat exchange does not occur. Dead volume comprises passageways inside the manifold between the valve restriction point and the ends of the cylinders is dead volume. Dead volume can have a deleterious impact on performance such as by negatively affecting efficiency.

Hydraulic and pneumatic systems can be paired together in applications including hydraulic lifts such as passenger elevators, in robotic manufacturing equipment, in vehicle brake systems, in fluid-driven hydraulic pumps and motors, and in fluid-driven gas intensifiers. In some applications, pneumatic and hydraulic fluids are linked by rigid mechanical apparatus. For example, a hydraulic gear pump can move a rotating shaft coupled mechanically to a second rotating shaft to drive a gas blower.

Pneumatic and hydraulic fluids can interface more directly. In an example, a bladder such as a gas placed into a pressurized hydraulic piping run to absorb and damped pressure shocks and disturbances. A hydraulic "accumulator" references a devices that contain a hydraulic-pneumatic interface and that are used in these applications.

Figure 20:
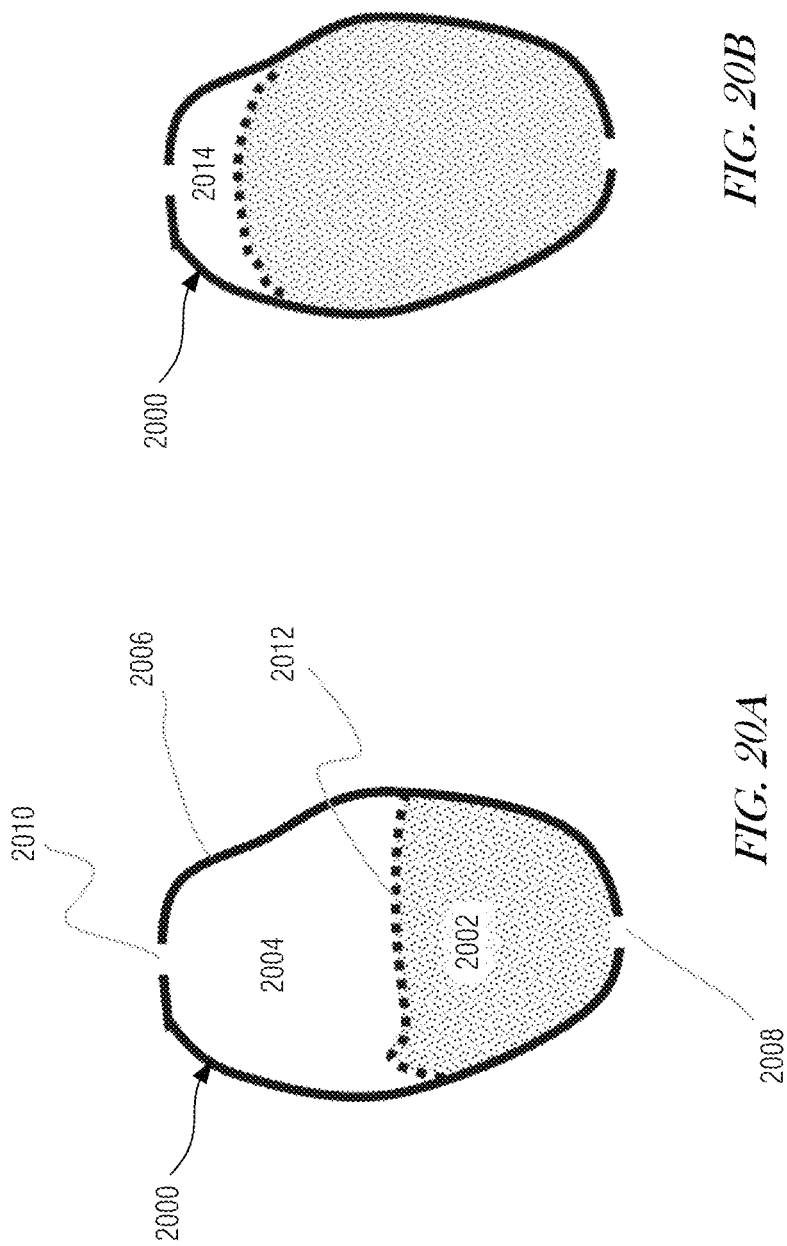
FIG. 20A is a cross-sectional view of an accumulator, according to an example.
FIG. 20B is another view of the accumulator of FIG. 20A.

FIG. 20A is a cross-sectional view of an accumulator, according to an example. FIG. 20B is another view of the accumulator of FIG. 20A. Features accumulators discussed herein are diagramed in FIGS. 20A-B and include: a hydraulic volume 2002 and a pneumatic volume 2004 that press against each other in a fixed volume shell 2006. There are hydraulic and pneumatic ports, 2008 and 2010, respectively, allowing the passage of the fluids through the shell as desired. There can be a moveable partition or physical barrier, 2012, separating the volumes 2002 and 2004. Various accumulators include a pneumatic fluid that is a pure inert gas such as Nitrogen. Both oil-based and water-based hydraulic fluids are used in various examples. Some examples have a minimum pneumatic volume 2014 as shown in FIG. 20B.

Moveable partition 2012 can be constructed in different ways according to the present subject matter. Piston accumulators typically are cylindrical geometry with rigid metal piston barriers that are sealed to the inner walls of the cylinder with O-rings. The piston partition slides along the cylinder as the amount of hydraulic fluid in the shell changes in response to external pressure changes. Bladder accumulators have an elastomer bladder akin to a balloon, and diaphragm accumulators have an elastomer diaphragm that is sealed to the inner wall of the accumulator vessel.

One of the ports 2008, 2010 can be sealed during operation. Pneumatic fluid can be exchanged with external components though port 2010 during normal operation. For example, the term "hydraulic compression" has been used in high-pressure natural gas pumping applications, for example where natural gas is the pneumatic fluid. Devices which have gas exchange through port 2010 during normal operation can be termed "liquid pistons". One difference in design between liquid pistons and accumulators is that liquid piston applications benefit where the minimum pneumatic volume, 2014, approaches zero. As used herein, the term "accumulator" is comprehensive of liquid pistons, unless otherwise noted.

Elastomeric membranes with fiber and fabric reinforcement can be used in hydraulic and pneumatic components such as accumulators, valves and rolling seal pistons. Example elastomeric materials that can be used have trade names such as EPDM, neoprene, Teflon, Nitrite rubber, and others. Example fibers used are cotton, polyesters, nylon, Kevlar, and others. The elastomer material can separate fluids; it can stretch and can be compliant, behaving as a highly viscous fluid, under pressure. The fibers can generally be of fixed dimensions and behave as bendable solid beams.

A thicker elastomer can contain thicker fibers and can have lower permeability. It can have greater restriction on the bend radius and can more tear or breach when pinched under pressure. Membranes can have rigid metal or plastic inserts and durable reinforcement or for attachment. They can have perforations for bolt holes at the periphery (e.g., at sealing points) or for mechanical supports or guides. Membranes can be referred to as bladders or diaphragms with the distinction coming in the general shape and method of attachment into the accumulator, valve, or other device.

Figure 21:
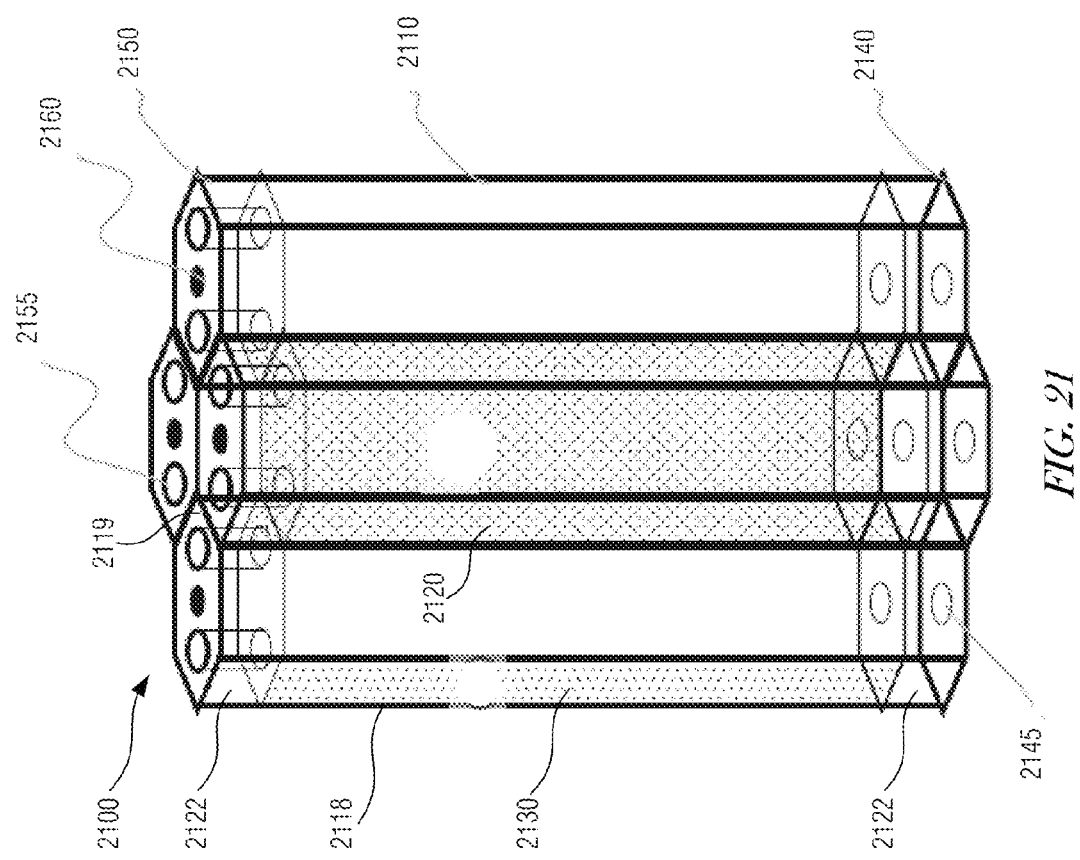
FIG. 21 is a perspective view of a multi-cellular accumulator, according to an example.

FIG. 21 is a perspective view of a multi-cellular accumulator 2100. Examples are included in which the accumulator is a multi-cellular accumulator 2100, and the first movable partition includes a plurality of movable partitions (e.g., 2400 in FIG. 22) disposed in the multi-cellular accumulator 2100. Examples are included in which the plurality of volumes are divided by at least one common dividing wall 2119. The shell 2118 of the multi-cellular accumulator 2100 can comprise one or more integrated heat exchangers, such as air-cooled fins or air-liquid heat exchangers, including those that exchange fluid with other components of a system such as the system illustrated in FIG. 1.

The multi-cellular accumulator 2100 can comprise a shell core 2110, which does not include end-plates 2122. The shell core 2110 can comprise an array of cells. The array of cells can be separated by internal dividers 2120. The array of cells can be at least partially enclosed by an outer wall 2130. The array of cells can be at least partially enclosed by a hydraulic end plate 2140. The array of cells can be at least partially enclosed by a pneumatic end plate 2150.

The hydraulic end plate 2140 can comprise an array pattern that substantially matches the array pattern that can be at least partially defined by the array of cells. The hydraulic end plate 2140 can comprise one or more hydraulic ports 2145. In an example, the hydraulic end plate 2140 comprises one hydraulic port 2145 for each cell that makes up the array of cells.

The pneumatic end plate 2150 can comprise an array pattern that substantially matches the array pattern that can be at least partially defined by the array of cells. They pneumatic end plate 2150 can comprise one or more pneumatic ports 2155. In an example, the pneumatic end plate 2150 comprises one pneumatic port 2155 for each unit that makes up the array of cells. The pneumatic end plate 2150 can comprise one or more bear attachment points 2160. In an example, the pneumatic end plate 2150 can comprise one bare attachment point 2160 for each cell that makes up the array of cells.

In an example of the shell core 2110, each of the cells that create the array of cells can have the same size and shape. In an example of the shell core 2110, one or more of the cells that create the army of cells can have different sizes or shapes. In an example, the array of cells can be a close-packed hexagonal array.

Examples are included in which the plurality of volumes are hexagonal in cross-section, interlocking with one another in a honeycomb configuration. Examples are included in which the at least one common dividing wall 2119 is of a substantially uniform thickness. Examples are included in which at least one moveable partition includes a bladder. Examples are included in which a plurality of hydraulic ports are in fluid communication via a manifold.

Figure 22:
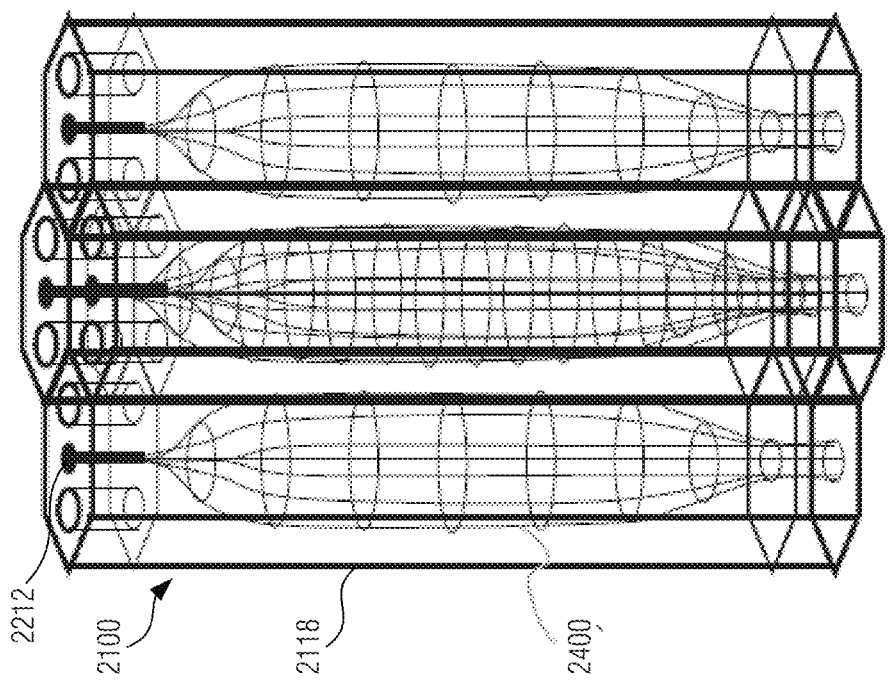
FIG. 22 is a perspective view of a multi-cellular accumulator, according to an example.

FIG. 22 is a perspective view of a multi-cellular accumulator interior, according to an example. The multi-cellular accumulator 2300 can comprise a moveable partition 2400, such as a membrane, such as to keep a pneumatic fluid separate from a hydraulic fluid.

Some examples include a respective moveable partition disposed in each of the volumes, with each moveable partition sealed around a respective hydraulic port, partitioning the respective volume interior into a respective hydraulic port side and a respective pneumatic port side.

Examples are included in which a hydraulic port 2145 is disposed through the bottom of the shell and is in fluid communication with an interior of the bladder at a bottom portion of the bladder, with a top portion of the bladder coupled to the top of the shell.

Figure 23B:
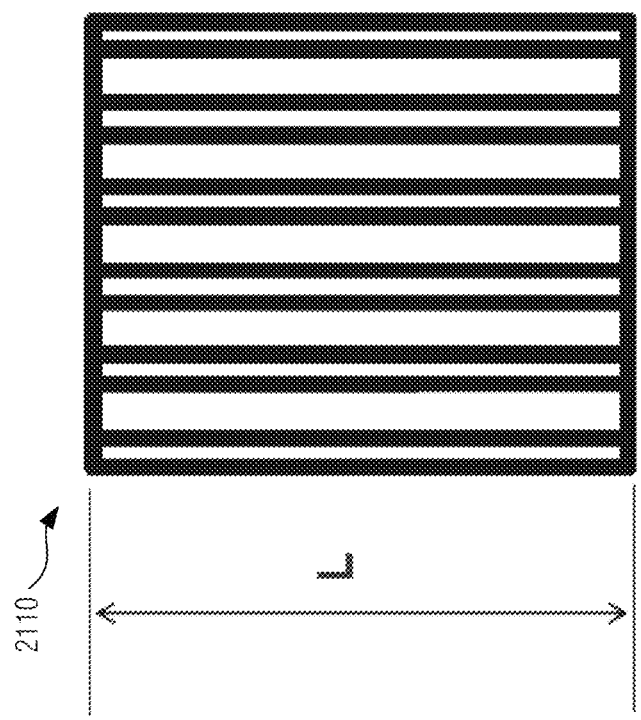
FIG. 23B shows a side view of the shell core, according to an example.
Figure 23A:
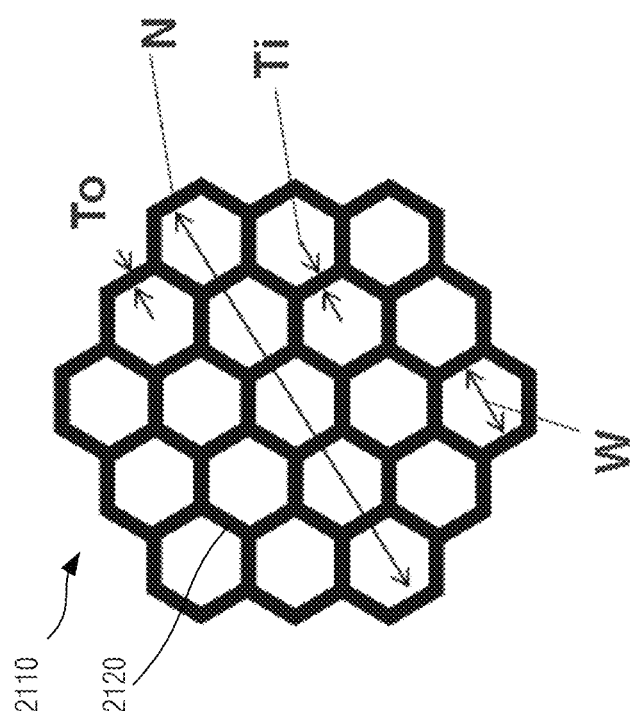
FIG. 23A shows a plan view the shell core, according to an example.

FIG. 23A shows a plan view the shell core 2110, according to an example. FIG. 23B shows a side view of the shell core 2110, according to an example. In an example, the shell core 2110 can include the following dimensions: the number of cells across N can be 5 mm, the width of a cell W can be 25 mm, the thickness Ti of the internal dividers 2120 can be 5 mm, the thickness To of the outer wall 2130 can be 7 mm, and the height H of the shell core 2110 can be 150 mm. Other dimensions are possible. Other ratios of dimensions are possible.

Figure 24:
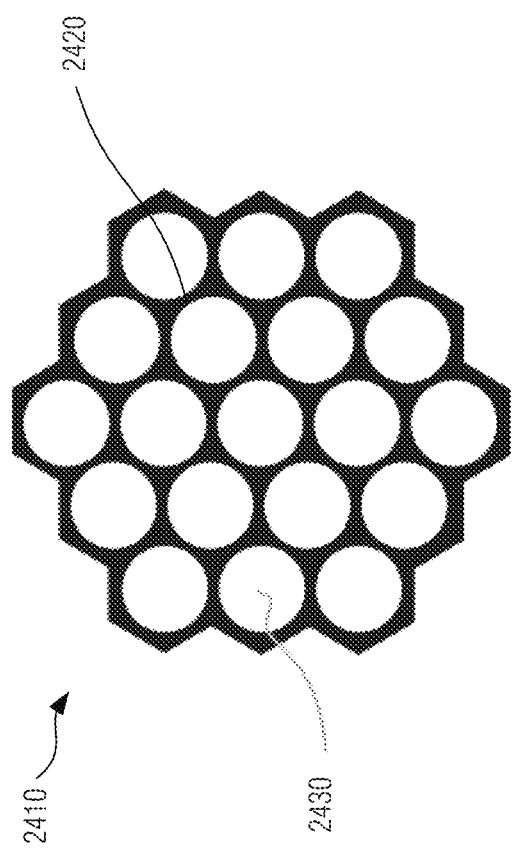
FIG. 24 shows a plan view of the shell core, according to an example.

FIG. 24 shows a plan view of a shell core 2410, according to an example. In an example, the thickness of the internal dividers 2420 can vary. In an example where the internal dividers have varying thicknesses, the array of cells can have a hexagonal close-packed arrangement. Examples are included in which the plurality of volumes are hexagonal in cross-section, interlocking with one another in a honeycomb configuration, with each volume having a circular cross-section. The cells can define a cylindrical interior 2430.

Figure 25:
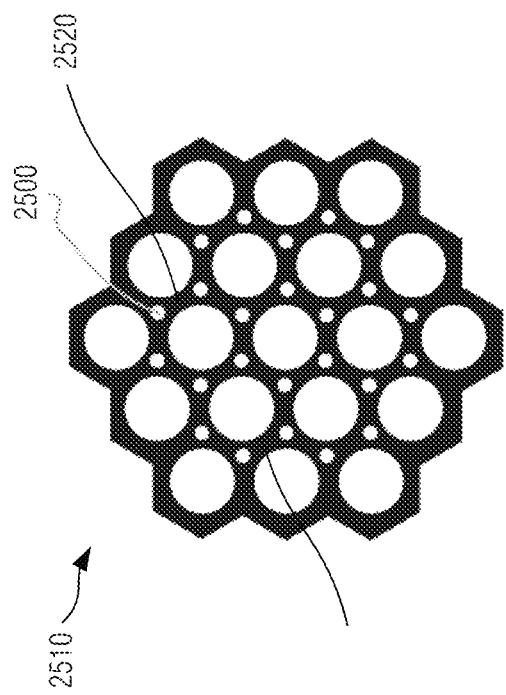
FIG. 25 shows a cross-section view of a shell core.

FIG. 25 shows a cross-section view of a shell core 2510. In an example, the internal dividers 2520 can comprise one or more channels 2500, such as to permit fluid to pass along the shell core 2510, such as through or proximal a common dividing wall. Fluid can pass along the channels 2500, such as to maintain the temperature of the shell core 2310. The channels 2500 can be at the vertices of the cells. Other locations for the channels 2500 are also possible.

Compressible fluids, such as gases, heat when they are compressed and cool when they expand. The gas can be in thermal contact with one or more of the following: the materials of the accumulator, the accumulator ports, or other attachments. As work is done to exchange hydraulic and/or pneumatic fluids through the accumulator ports some energy can be lost, such as through vibrations or noise. Some energy can go into heating or cooling the compressible fluid.

In an example, as the rate of the fluid exchange process increases, the rate of temperature change can increase. In an example, as the rate of the fluid exchange process increases the maximum temperature excursion can increase.

In an example, once work ceases then the temperature can relax to the ambient background temperature, such as by heat conduction, convection, or radiation. The ideal gas law can be described the behavior of many common pneumatic fluids, such as in the temperature range of −20 degrees Celsius to 100 degrees Celsius and in the pressure range of 0 pounds per square inch ("psi") to 5000 psi.

In an example, the shape and design of the multi-cellular accumulator can be such that when there is the greatest rate of change in pressure, the air pocket can be in the form of a thin shell. The air pocket in the form of a thin shell can have maximum surface contact with the solid structure of the shell.

In an example, the internal surfaces and flow patterns of the air during compression and expansion can be designed such that the turbulence or velocity of the air flow near the surface of the shell can be optimized to improve the heat exchange between the air and the surface. The internal surfaces and flow patterns can be designed such as to homogenize the air temperature throughout the air volume.

Returning to FIG. 22, in an example, the membrane 2400 separating the hydraulic and pneumatic volumes can be a multi-layer composite. The multi-layer composite can have one or more of the following properties: (i) it can support bidirectional large pressure differentials exceeding 300 BAR, (ii) it can have low permeability to common gases, such as nitrogen and oxygen, it can be stable in contact with air, water, mild acid and base, water-based and oil-based hydraulic (iii) it can maximize the volumetric utilization of the shell, such as by having a pneumatic volume approaching the internal volume of the shell, such as when pneumatic pressure is greater than hydraulic pressure and has pneumatic volume near zero, such as when hydraulic pressure exceeds pneumatic pressure, or (iv) it can have a high durability and long cycle life.

In an example, the membrane 2400 can be supported from the base or the anchor points 2212. In an example, the membrane 2400 can be an elastomeric membrane 2400. The elastic membrane 2400 can be reinforced with polyester or nylon fibers.

Figure 26C:
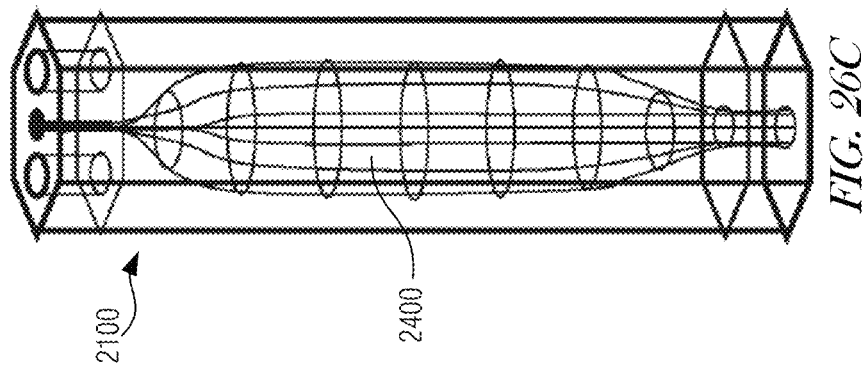
FIG. 26C shows various stages of the membrane expanding with hydraulic fluid, according to an example.
Figure 26B:
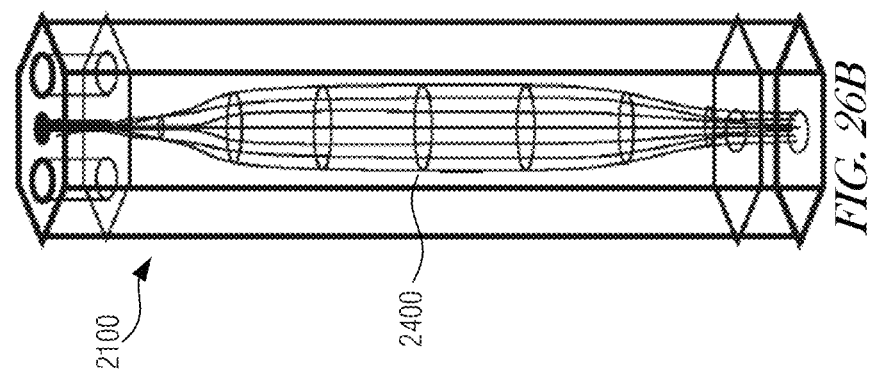
FIG. 26B shows various stages of the membrane expanding with hydraulic fluid, according to an example.
Figure 26A:
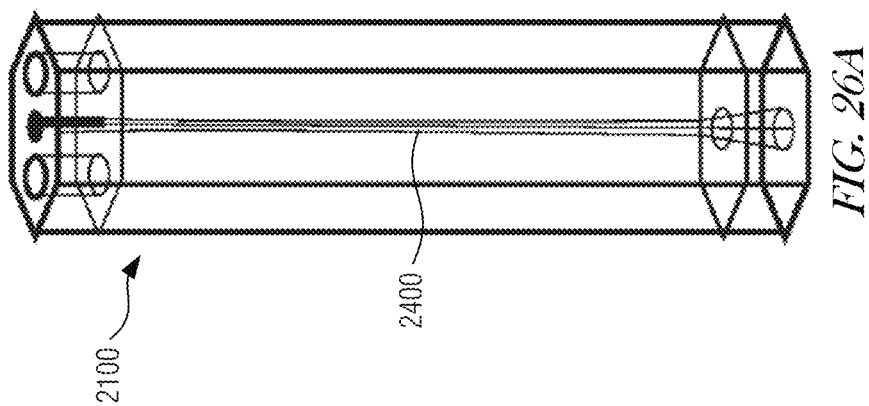
FIG. 26A shows various stages of the membrane expanding with hydraulic fluid, according to an example.

FIGS. 26A-C show various stages of the membrane 2400 expanding with hydraulic fluid, according to an example. In an example, the membrane 2400 is collapsed and all hydraulic fluid is drained or forcefully expelled by pneumatic fluid on the pneumatic side of the membrane 2400. With sufficient pressure or over enough cycles the membrane 2400 can be pinched or damaged as the bend radius of the membrane 2400 folds will be less than a minimum value and the sheer strain on the membrane 2400 can exceed maximum limits.

Figure 27:
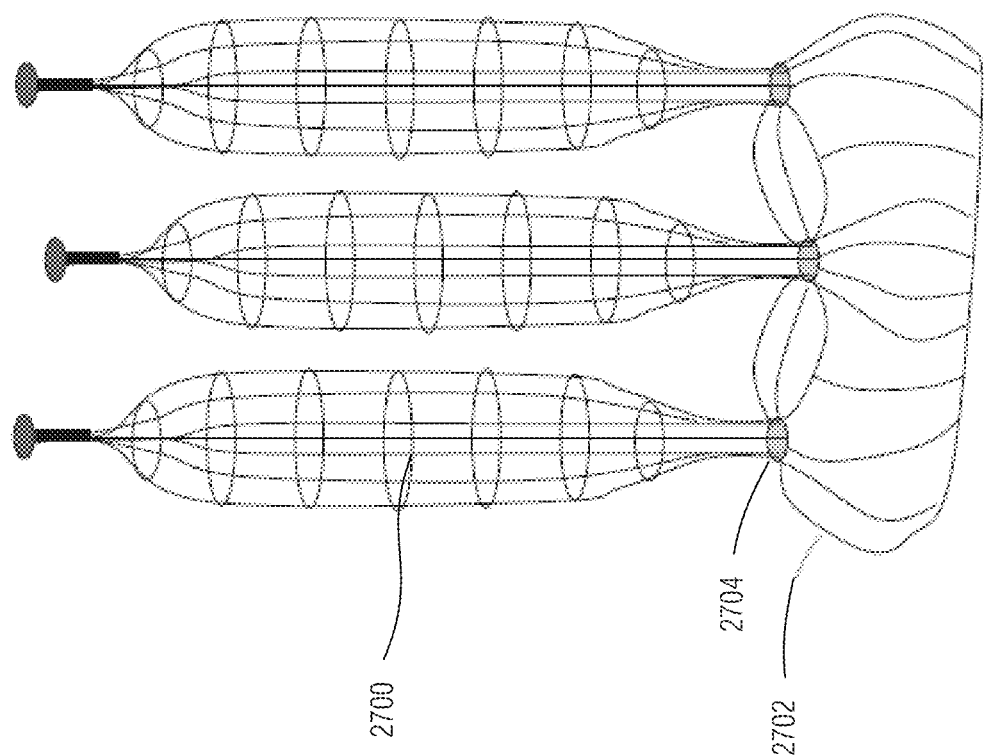
FIG. 27 shows a method for supplying hydraulic fluid to more than one cell.

FIG. 27 shows a method for supplying hydraulic fluid to more than one cell. The membranes 2700 of one or more cells can be seamlessly connected by a common reservoir 2702, such as to form one continuous seamless unit. Examples are included in which a plurality of hydraulic ports 2704 are in fluid communication, configured to commute a pressure on one side of a common dividing wall to an opposite side of the common dividing wall.

In an example, the membrane 2700 can be a thin polyester film, such as Mylar. The thin polyester film can not be reinforced, except at points of interface or attachment to the shell structure. The membrane 2400 does not need to change dimensions significantly in the pressure range up to 300 BAR at temperatures below 100 degrees Celsius.

Examples are included which the respective pneumatic port in fluid communication with an exterior of the bladder is one of a plurality of ports in fluid communication with one another.

Figure 28A:
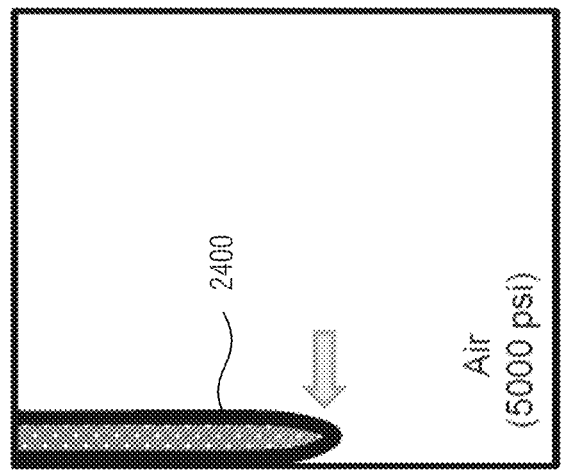
FIG. 28A shows an operational mode for a membrane.
Figure 28B:
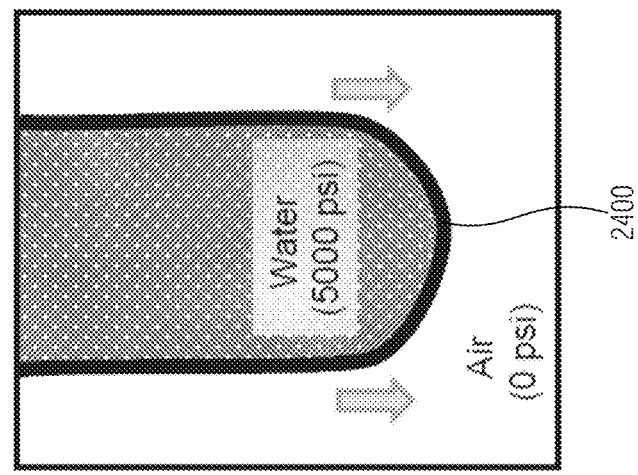
FIG. 28B shows an operational mode for a membrane.
Figure 28C:
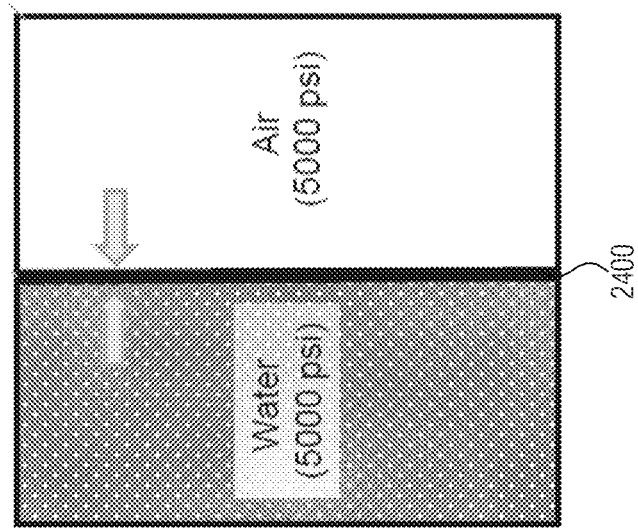
FIG. 28C shows an operational mode for a membrane.

FIGS. 28A-C show the four main potential failure modes for the membrane 2400. The four main potential failure modes for the membrane 2400 are: crushing failure, excessive permeability, tensile failure, and shear failure.

Figure 29B:
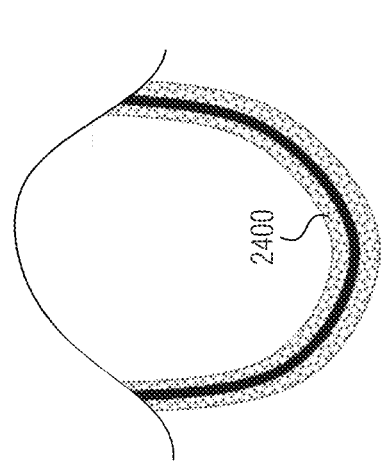
FIG. 29B shows view 29A from FIG. 29A.
Figure 29A:
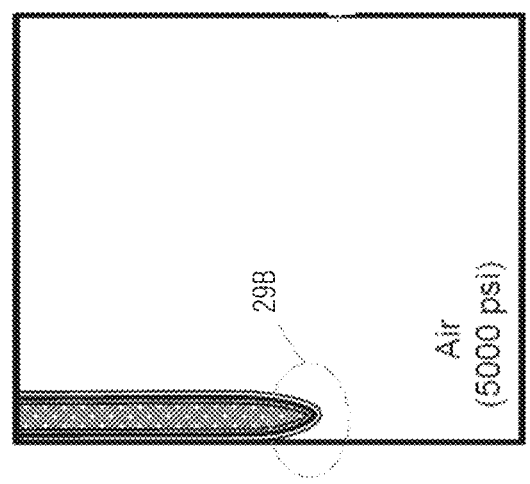
FIG. 29A shows a layered stack that can be used, according to an example.

FIGS. 29A-B show two embodiments of layered stacks that can be used, according to an example. Multiple layers can be used such as to improve the shear strength or lifetime of the membrane 2400. The multiple layer can be bonded or un-bonded, such as with adhesive or another form of joining, including welding.

Figure 30:
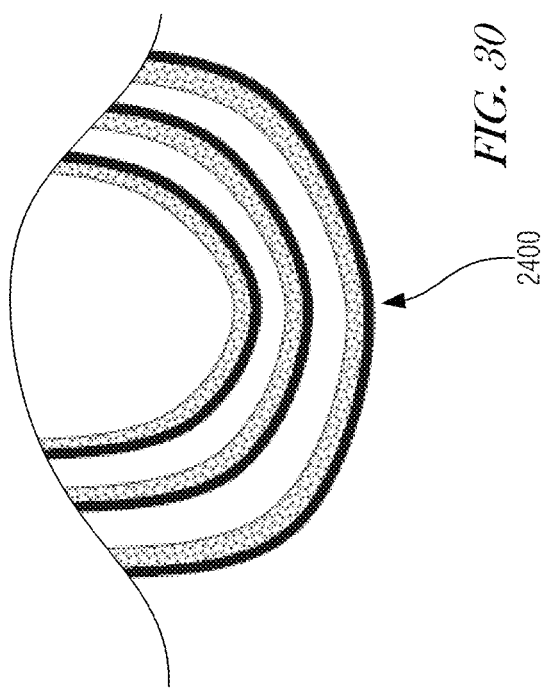
FIG. 30 illustrates multiple layers, according to an example.

FIG. 30 illustrates multiple layers, according to an example. As with FIG. 29, multiple layer can be bonded or un-bonded, such as with adhesive or another form of joining, including welding.

Figure 31:
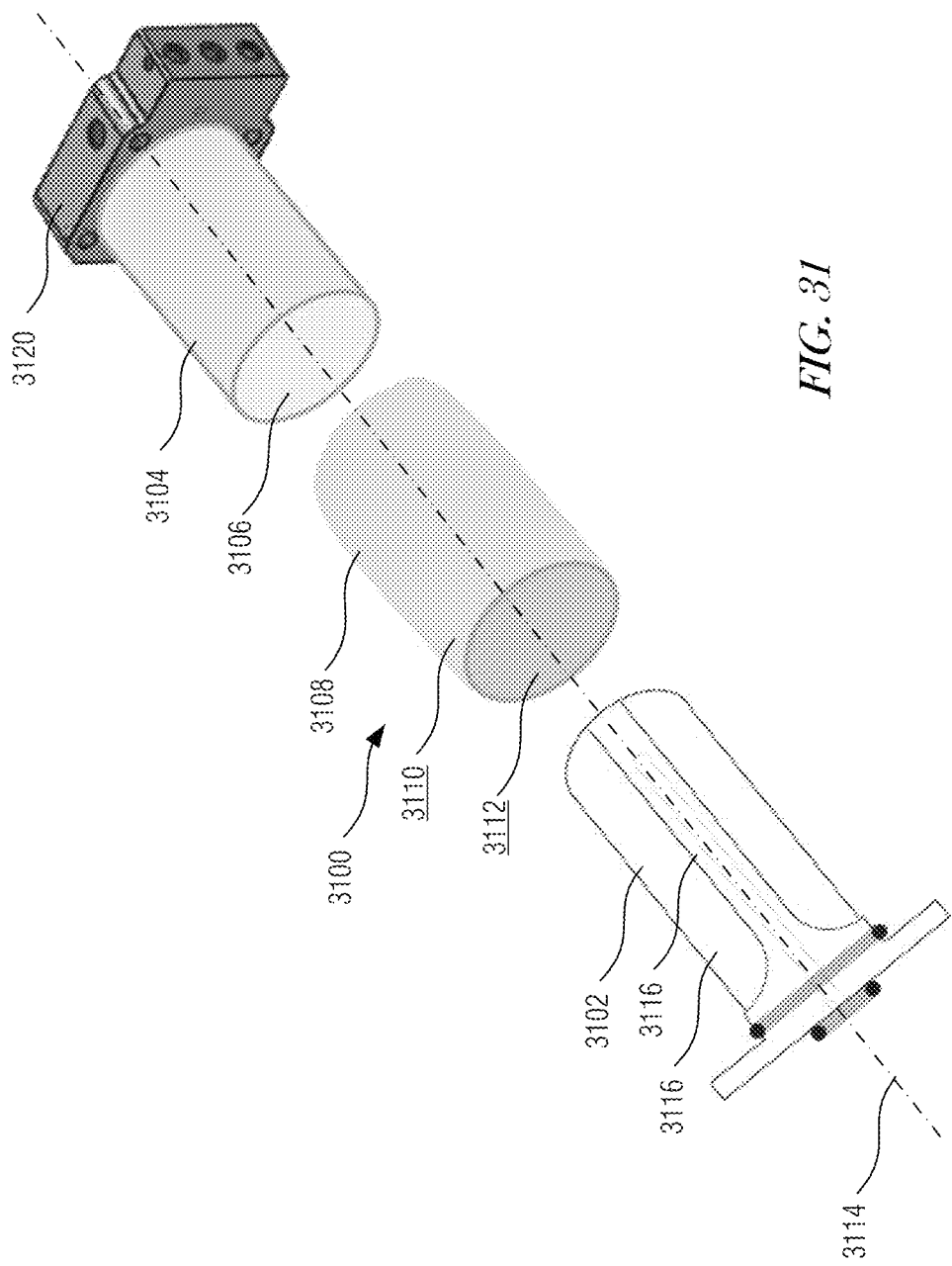
FIG. 31 is an exploded perspective view of an accumulator including mandrel.

FIG. 31 is an exploded perspective view of an accumulator 3100 including a mandrel 3102. Some examples include a vessel 3104 defining at least one vessel port 3106 extending from an interior of the vessel 3104 to an exterior of the vessel 3104. The vessel 3104 can be coupled to a manifold 3120. Examples are included in which the vessel is cylindrical. Some examples include a moveable partition 3108 disposed in the vessel 3104 and sealed around the vessel port 3106, partitioning the vessel interior into a vessel port side 3110 and a mandrel side 3112. The first movable partition 3108 is configured to flex against the mandrel 3102. Examples are included in which the vessel 3104 is elongate, extending along an axis 3114, and the mandrel 3102 is elongate, extending along the axis 3114, with the first movable partition 3108 configured to envelope the mandrel 3102. Examples are included in which the moveable partition 3108 includes a diaphragm. Examples are included in which the moveable partition 3018 is a bladder. Examples are included in which the mandrel 3102 includes a plurality of lobes 3116. Examples are included in which the mandrel includes four lobes.

Figure 32:
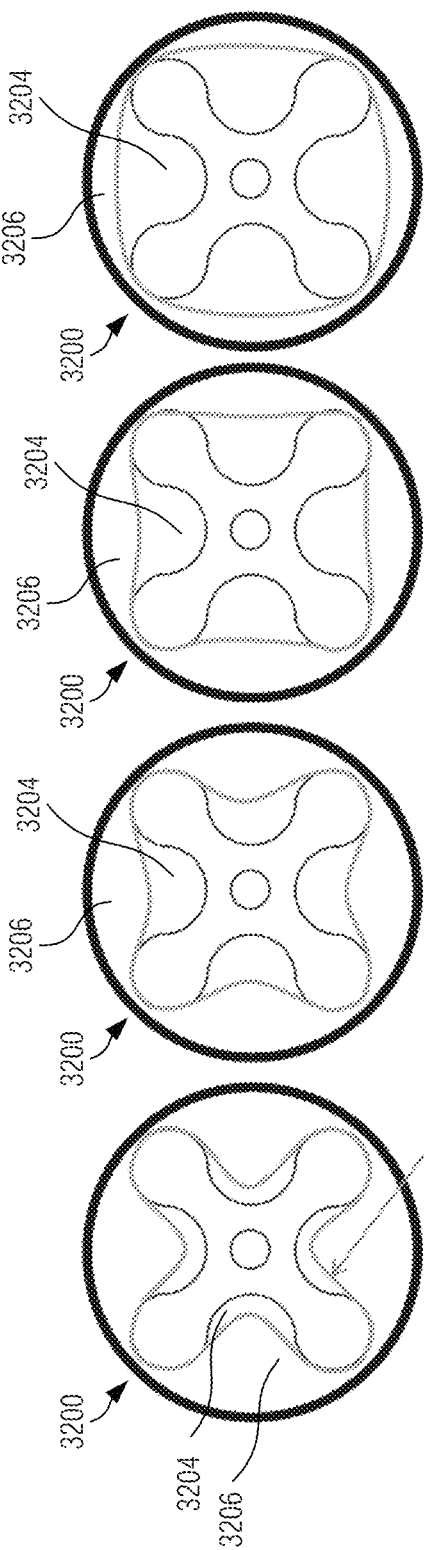
FIG. 32A is a cross-section of an accumulator including a mandrel, according to an example.
FIG. 32B is a cross-section of an accumulator including a mandrel, according to an example.
FIG. 32C is a cross-section of an accumulator including a mandrel, according to an example.
FIG. 32D is a cross-section of an accumulator including a mandrel, according to an example.
FIG. 32E is a cross-section of an accumulator including a mandrel, according to an example.

FIGS. 32A-E is a cross-section of an accumulator including a mandrel, according to an example. Examples are included in which the vessel 3202 is configured to store a first fluid 3204 at a first pressure on a mandrel side of the movable partition. Examples are included in which the vessel is configured to store a second fluid 3206, having a bulk modulus lower than the first fluid, at a second pressure, lower than the first pressure, on a tank side of the first movable partition. In FIG. 32B, the proportion is 80% air/20% hydraulic fluid. In FIG. 32C, the proportion is 60% air/40% hydraulic fluid. In FIG. 32D, the proportion is 50% air/50% hydraulic fluid. In FIG. 32E, the proportion is 30% air/70% hydraulic fluid.

Figure 33:
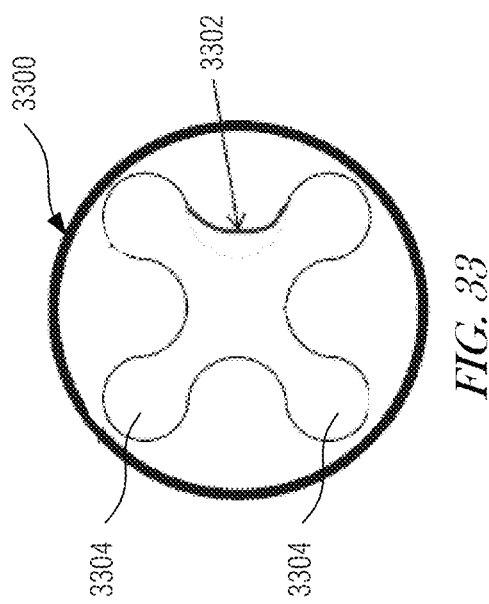
FIG. 33 is a cross-section of an accumulator including a mandrel, according to an example.

FIGS. 33A-B is a cross-section of an accumulator including a mandrel, according to an example. A transition portion between lobes 3304 can be less than semi-circular for a mandrel 3300, in an example.

Figure 34A:
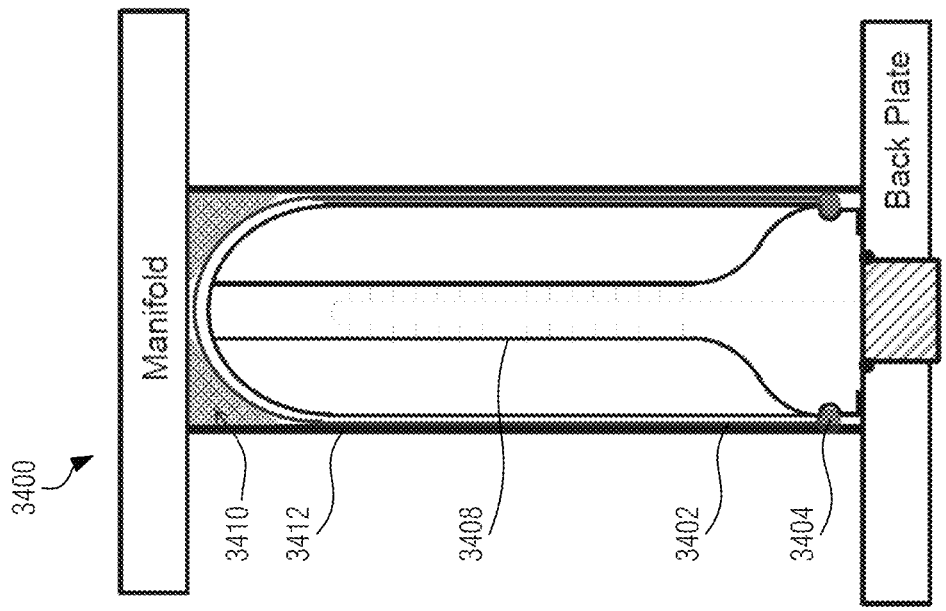
FIG. 34A is a portion of an accumulator assembly.
Figure 34B:
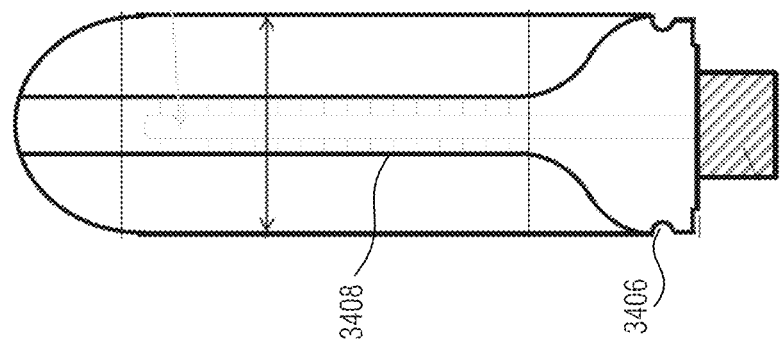
FIG. 34B is an additional portion of an accumulator assembly.
Figure 34C:
FIG. 34C shows additional details of an accumulator assembly.

FIGS. 34A-C is a portion of an accumulator 3400 assembly. Examples are included in which the moveable partition 3402 includes a rim 3404 that is thicker than a remainder of the moveable partition 3042 and that is shaped to conform to a recess 3406 in the base of the mandrel 3408. Examples are included in which the moveable partition 3402 seals to a base of the mandrel 3408. Some examples include an insert 3410 disposed in the vessel 3412 between the mandrel 3408 and the vessel 3410, the insert 3410 shaped to conform to the moveable partition 3402 while the moveable partition is disposed against the mandrel 3408. Examples are included in which the insert 3410 is porous and inert. Examples are included in which the insert is comprised of sintered material.

Figure 35:
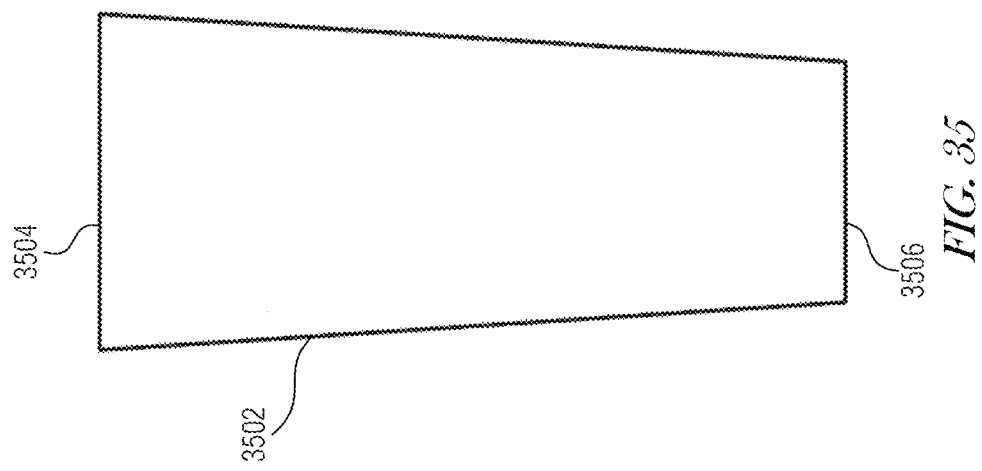
FIG. 35 shows a top view of an accumulator shell, according to an example.

FIG. 35 shows a top view of an accumulator shell, according to an example. Examples are included in which the vessel is frustoconical. Examples are included in which the vessel 3502 tapers away from the vessel port 3504, toward an opening 3506 sized to receive the mandrel. Examples are included in which the vessel is one of a plurality of vessels, each including a corresponding mandrel, with at least two vessels sharing a common dividing wall.

VARIOUS EXAMPLES & NOTES

Example 1 includes an apparatus, including a first accumulator. The example can include a first movable partition, disposed in the first accumulator, with a first hydraulic fluid disposed on one side of the first movable partition, and a first gas disposed on the other side of the first movable partition. The example can include a second accumulator. The example can include a second movable partition disposed in the second accumulator, with a second hydraulic fluid disposed on one side of the second movable partition and in fluid communication with the first hydraulic fluid of the first accumulator, and a second gas disposed on the other side of the second movable partition. The example can include a first manifold, coupled to each of the first and second accumulators, the first manifold defining a first passage in selectively valved fluid communication with the first gas of the first accumulator and the second gas of the second accumulator, the first manifold defining a first movable partition port in selectively valved fluid communication with the first gas of the first accumulator, and a second movable partition port in selectively valved fluid communication with the second gas of the second accumulator. The example can include a third accumulator. The example can include a third movable partition disposed in the third accumulator, with a third hydraulic fluid disposed on one side of the third movable partition, and a third gas disposed on the other side of the third movable partition. The example can include a fourth accumulator. The example can include a fourth movable partition disposed in the fourth accumulator, with a fourth hydraulic fluid disposed on one side of the fourth movable partition and in fluid communication with the third hydraulic fluid of the third accumulator, and a fourth gas disposed on the other side of the fourth movable partition. The example can include a second manifold, coupled to each of the third and fourth accumulators, the second manifold defining a second passage in selectively valved fluid communication with the third gas of the third accumulator and the fourth gas of the fourth accumulator, the second manifold defining a third movable partition port in selectively valved fluid communication with the first gas of the first accumulator and the third gas of the third accumulator, the second manifold defining a fourth movable partition port in selectively valved fluid communication with the second gas of the second accumulator and the fourth gas of the fourth accumulator.

Example 2 can include the previous example, such that each movable partition comprises a piston slideable in a corresponding accumulator.

Example 3 can include, or can optionally be combined with the subject matter of Example 2, such that the piston includes a frustoconical piston, and the accumulator includes a frustoconical recess sized and shaped to conform to receive and conform to the piston.

Example 4 can include, or can optionally be combined with the subject matter of Example 2, such that the piston includes a frustoconical piston, and the accumulator includes a frustoconical recess sized and shaped to dispose a gap between the accumulator and the piston.

Example 5 can include, or can optionally be combined with the subject matter of Example 4, such that the gap size increases toward and end of the piston.

Example 6 can include, or can optionally be combined with the subject matter of Example 4, comprising an impeller shaft extending from the accumulator, into a recess of the piston, the recess of the piston sized to admit the impeller shaft throughout a desired piston stroke inside the accumulator.

Example 7 can include, or can optionally be combined with the subject matter of Example 6, such that the impeller shaft is configured to rotate.

Example 8 can include, or can optionally be combined with the subject matter of Example 7, such that the impeller shaft is configured to impel fluid out of the recess of the piston.

Example 9 can include, or can optionally be combined with the subject matter of Example 4, comprising a passage extending through the piston, with a piston heat exchanger disposed in the passage.

Example 10 can include, or can optionally be combined with the subject. matter of Example 9, comprising an agitator to agitate the first gas across the piston heat exchanger.

Example 11 can include, or can optionally be combined with the subject matter of Example 1, such that each movable partition comprises a flexible diaphragm fixed to the accumulator.

Example 12 can include, or can optionally be combined with the subject matter of Example 1, comprising a first pump in fluid communication with the first hydraulic fluid and the second hydraulic fluid.

Example 13 can include, or can optionally be combined with the subject. matter of Example 12, comprising a reservoir in fluid communication with the first hydraulic fluid and the second hydraulic fluid via the first pump.

Example 14 can include, or can optionally be combined with the subject matter of Example 12, comprising a first motor generator coupled to the first pump.

Example 15 can include, or can optionally be combined with the subject matter of Example 12, comprising a first valve coupled between the first pump and the first hydraulic fluid and between the first pump and the second hydraulic fluid, the valve configured in a first operational mode to place a pump outlet in fluid communication with the first hydraulic fluid and a pump inlet in fluid communication with the second hydraulic fluid, and in a second operational mode to place the pump inlet in fluid communication with the first hydraulic fluid and the pump outlet in fluid communication with the second hydraulic fluid.

Example 16 can include, or can optionally be combined with the subject matter of Example 12, comprising a second pump in fluid communication with the third hydraulic fluid and the fourth hydraulic fluid.

Example 17 can include, or can optionally be combined with the subject matter of Example 16, comprising a second motor generator coupled to the second pump.

Example 18 can include, or can optionally be combined with the subject matter of Example 16, comprising a reservoir in fluid communication with the third hydraulic fluid and the fourth hydraulic fluid via the second pump.

Example 19 can include, or can optionally be combined with the subject matter of Example 12, such that the first pump is in fluid communication with the third hydraulic fluid and the fourth hydraulic fluid, with at least one valve coupled between the first pump and each of the first hydraulic fluid, second hydraulic fluid, third hydraulic fluid, and fourth hydraulic fluid, the at least one valve configured to switch between a first operational mode, in which the pump is in fluid communication with at least one of the first hydraulic fluid and the second hydraulic fluid, and a second operational mode, in which the pump is in fluid communication with at least one of the third hydraulic fluid and the fourth hydraulic fluid.

Example 20 can include, or can optionally be combined with the subject matter of Example 19, comprising a motor generator coupled to the first pump. The motor generator can be a variable speed motor generator configured to influence the pump at a selected range of speeds.

Example 21 can include, or can optionally be combined with the subject matter of Example 1, comprising a first gas accumulator in selectively valved fluid communication with the first gas and the second gas.

Example 22 can include, or can optionally be combined with the subject matter of Example 21, such that the first gas accumulator in selectively valved fluid communication with the first gas and the second gas via the first manifold.

Example 23 can include, or can optionally be combined with the subject matter of Example 21, comprising a second gas accumulator in selectively valved fluid communication with the third gas and the second fourth bulk modulus fluid.

Example 24 can include, or can optionally be combined with the subject matter of Example 23, such that the second gas accumulator in selectively valved. fluid communication with the third gas and the fourth gas via the second manifold.

Example 25 can include, or can optionally be combined with the subject matter of Example 21, comprising a second pump in fluid communication with the third hydraulic fluid and the fourth hydraulic fluid, with an accumulator having a fifth accumulator with a fifth movable partition disposed inside the fifth accumulator, with a fifth hydraulic fluid disposed on one side of the fifth movable partition in selectively valved fluid communication with the second pump and a fifth gas disposed on the other side of the fifth movable partition in selectively valved fluid communication with the second gas accumulator.

Example 26 can include, or can optionally be combined with the subject matter of Example 1, comprising a gas-to-liquid heat exchanger coupled to the first passage.

Example 27 can include, or can optionally be combined with the subject matter of Example 1, comprising cooling fins disposed on at least one of the first, second, third and fourth accumulators.

Example 28 can include, or can optionally be combined with the subject matter of Example 1, comprising cooling fins disposed on one of the first and second manifolds.

Example 29 can include, or can optionally be combined with the subject matter of Example 1, such that the first manifold is liquid-cooled, defining a liquid cooling passage isolated from each passage and port of the first manifold.

Example 30 can include, or can optionally be combined with the subject matter of Example 29, comprising an agitator disposed inside the first accumulator, and disposed inside the first gas, the agitator to agitate the first gas against the liquid-cooled manifold.

Example 31 can include, or can optionally be combined with the subject. matter of Example 30, such that the agitator is a fan.

Example 32 can include, or can optionally be combined with the subject matter of Example 30, comprising a thermoelectric energy converter coupled to the first manifold to power the agitator.

Example 33 can include, or can optionally be combined with the subject matter of Example 30, such that the agitator is coupled to a fluid powered motor in fluid communication with a fluid of the liquid-cooled manifold.

Example 34 can include, or can optionally be combined with the subject matter of Example 33, comprising a power source coupled to the thermoelectric energy converter to store energy of the thermoelectric energy converter and to power the agitator.

Example 35 can include, or can optionally be combined with the subject matter of Example 1, comprising a heat exchanger disposed in the first accumulator, and disposed inside the first gas, in thermal communication with the first movable partition.

Example 36 can include, or can optionally be combined with the subject matter of Example 1, comprising a spring disposed inside the first accumulator, and disposed inside the first gas, the spring configured to vibrate in close proximity to the interior wall of the accumulator.

Example 37 can include, or can optionally be combined with the subject matter of Example 1, comprising a spring disposed inside the first accumulator, and disposed inside the first gas, the spring configured to scrape in close proximity to the interior wall of the accumulator.

Example 38 can include, or can optionally be combined with the subject matter of Example 37, such that at least one movable partition comprises a frustoconical piston slideable in a corresponding accumulator and the corresponding accumulator includes a frustoconical recess sized and shaped to conform to the frustoconical piston to receive the piston.

Example 39 can include, or can optionally be combined with the subject matter of Example 38, such that at least one of the frustoconical piston and the frustoconical recess is flexible.

Example 40 can include, or can optionally be combined with the subject matter of Example 1, comprising a phase-change material disposed in a wall of the first accumulator.

Example 41 can include, or can optionally be combined with the subject matter of Example 40, comprising a phase-change material disposed in the first manifold.

Example 42 can include, or can optionally be combined with the subject matter of Example 1, comprising a thermoelectric energy converter coupled to the first accumulator.

Example 43 can include, or can optionally be combined with the subject matter of Example 1, comprising a mandrel disposed in the first accumulator, the first movable partition configured to flex against the manifold.

Example 44 can include, or can optionally be combined with the subject matter of Example 43, such that the first accumulator is elongate, extending along an axis, and the mandrel is elongate, extending along the axis, the first movable partition enveloping the mandrel, with the first hydraulic fluid on a mandrel side of the first movable partition, and the first lower bulk module fluid on an accumulator side of the first movable partition.

Example 45 can include, or can optionally be combined with the subject matter of Example 1, such that the first accumulator is a multi-cellular accumulator, and the first movable partition is one of a plurality of movable partitions disposed in the multi-cellular accumulator.

Example 46 can include, or can optionally be combined with the subject matter of Example 45, including a vessel defining at least one vessel port extending from an interior of the vessel to an exterior of the vessel. The example can include a moveable partition disposed in the vessel and sealed around the vessel port, partitioning the vessel interior into a vessel port side and a mandrel side. The example can include a mandrel disposed in the vessel in the mandrel side of the interior of the vessel and defining at least one mandrel port extending from the interior of the vessel to an exterior of the mandrel. Optional examples are included in which the moveable partition is configured to flex against the mandrel.

Example 47 can include, or can optionally be combined with the subject matter of Example 46, such that the vessel is elongate, extending along an axis, and the mandrel is elongate, extending along the axis, the first movable partition configured to envelope the mandrel.

Example 48 can include, or can optionally be combined with the subject matter of Example 46, such that the vessel is configured to store a first fluid at a first pressure on a mandrel side of the movable partition.

Example 49 can include, or can optionally be combined with the subject. matter of Example 48, such that the vessel is configured to store a second fluid, having a bulk modulus lower than the first fluid, at a second pressure, lower than the first pressure, on a tank side of the first movable partition.

Example 50 can include, or can optionally be combined with the subject matter of Example 46, such that the moveable partition includes a diaphragm.

Example 51 can include, or can optionally be combined with the subject matter of Example 46, such that the moveable partition is a bladder.

Example 52 can include, or can optionally be combined with the subject matter of Example 46, such that the mandrel includes a plurality of lobes.

Example 53 can include, or can optionally be combined with the subject matter of Example 52, such that the mandrel includes four lobes.

Example 54 can include, or can optionally be combined with the subject matter of Example 46, such that the vessel is cylindrical.

Example 55 can include, or can optionally be combined with the subject matter of Example 46, comprising cooling channels disposed through the mandrel, sealed from the interior of the vessel.

Example 56 can include, or can optionally be combined with the subject matter of Example 46, such that the moveable partition seals to a base of the mandrel.

Example 57 can include, or can optionally be combined with the subject matter of Example 56, such that the moveable partition includes a rim that is thicker than a remainder of the moveable partition and that is shaped to conform to a recess in the base of the mandrel.

Example 58 can include, or can optionally be combined with the subject matter of Example 46, comprising an insert disposed in the vessel between the mandrel and the vessel, the insert shaped to conform to the moveable partition while the moveable partition is disposed against the mandrel.

Example 59 can include, or can optionally be combined with the subject matter of Example 58, such that the insert is porous and inert.

Example 60 can include, or can optionally be combined with the subject. matter of Example 59, such that the insert is comprised of sintered bronze.

Example 61 can include, or can optionally be combined with the subject matter of Example 46, such that the vessel is frustoconical.

Example 62 can include, or can optionally be combined with the subject matter of Example 61, such that the vessel tapers away from the vessel port, toward an opening sized to receive the mandrel.

Example 63 can include, or can optionally be combined with the subject matter of Example 46, comprising a heat exchanger coupled to the vessel.

Example 64 can include, or can optionally be combined with the subject. matter of Example 63, such that the heat exchanger includes fins disposed on the exterior of the vessel.

Example 65 can include, or can optionally be combined with the subject matter of Example 46, such that the vessel is one of a plurality of vessels, each including a corresponding mandrel, with at least two vessels sharing a common dividing wall.

Example 66 can include, or can optionally be combined with the subject matter of Example 65, including a shell defining a plurality of interior volumes, with a respective hydraulic port extending from a respective interior of the volume to a respective exterior of the shell, and a respective pneumatic port extending from the respective interior of the volume to the respective exterior of the shell, such that the plurality of volumes are divided by at least one common dividing wall. The example can include a respective moveable partition disposed in each of the volumes, with each moveable partition sealed around a respective hydraulic port, partitioning the respective volume interior into a respective hydraulic port side and a respective pneumatic port side. Optional examples are included in which a plurality of hydraulic ports are in fluid communication, configured to commute a pressure on one side of the common dividing wall to an opposite side of the common dividing wall.

Example 67 can include, or can optionally be combined with the subject matter of Example 66, such that the plurality of volumes are hexagonal in cross-section, interlocking with one another in a honeycomb configuration.

Example 68 can include, or can optionally be combined with the subject matter of Example 66, such that at least one moveable partition includes a bladder.

Example 69 can include, or can optionally be combined with the subject matter of Example 68, such that shell has a top and a bottom opposite the top, with the at least one common dividing wall extending between the top and the bottom, and wherein a hydraulic port is disposed through the bottom of the shell and is in fluid communication with an interior of the bladder at a bottom portion of the bladder, with a top portion of the bladder coupled to the top of the shell.

Example 70 can include, or can optionally be combined with the subject matter of Example 69, such that the respective pneumatic port in fluid communication with an exterior of the bladder is one of a plurality of ports in fluid communication with one another.

Example 71 can include, or can optionally be combined with the subject matter of Example 70, such that each of the pneumatic ports is one of a respective plurality of ports, with each pneumatic port of a respective plurality being in fluid communication with the remainder of pneumatic ports of the respective plurality.

Example 72 can include, or can optionally be combined with the subject matter of Example 66, such that the at least one common dividing wall is of a substantially uniform thickness.

Example 73 can include, or can optionally be combined with the subject. matter of Example 66, such that the plurality of volumes are hexagonal in cross-section, interlocking with one another in a honeycomb configuration, with each volume having a circular cross-section.

Example 74 can include, or can optionally be combined with the subject matter of Example 66, comprising a fluid cooling port disposed through the at least one common dividing wall.

Example 75 can include, or can optionally be combined with the subject matter of Example 66, comprising at least one fluid cooling port disposed adjacent the at least one common dividing wall.

Example 76 can include, or can optionally be combined with the subject matter of Example 66, such that the plurality of volumes are hexagonal in cross-section, interlocking with one another in a honeycomb configuration, such that a central interior volume is defined by six common dividing walls.

Example 77 can include, or can optionally be combined with the subject matter of Example 76, such that the central interior volume is disposed adjacent a plurality of interior volumes, each defined by six respective common dividing walls.

Example 78 can include, or can optionally be combined with the subject matter of Example 66, such that a plurality of hydraulic ports are in fluid communication via a manifold.

Example 79 can include, or can optionally be combined with the subject matter of Example 78, including a first accumulator. The example can include a first movable partition disposed in the first accumulator, the first accumulator configured to receive a hydraulic fluid disposed on one side of the first movable partition, the accumulator configured to receive a gas disposed on the other side of the first movable partition. The example can include a second accumulator. The example can include a second movable partition disposed in the second accumulator, the second accumulator configured to receive a hydraulic fluid disposed on one side of the second movable partition and in fluid communication with the hydraulic fluid of the first accumulator, the accumulator configured to receive a gas disposed on the other side of the second movable partition. The example can include a first manifold, with each of the first and second accumulators coupled to the first manifold, the first manifold defining a first passage in selectively valved fluid communication with the gas of the first accumulator and the second accumulator, the first manifold defining a first movable partition port in selectively valved fluid communication with the gas of the first accumulator, and a second movable partition port in selectively valved fluid communication with the gas of the second accumulator. The example can include a third accumulator. The example can include a third movable partition disposed in the third accumulator, the third accumulator configured to receive a hydraulic fluid disposed on one side of the third movable partition, the accumulator configured to receive a gas disposed on the other side of the third movable partition. The example can include a fourth accumulator. The example can include a fourth movable partition disposed in the fourth accumulator, the fourth accumulator configured to receive a hydraulic fluid disposed on one side of the fourth movable partition and in fluid communication with the hydraulic fluid of the third accumulator, the accumulator configured to receive a gas disposed on the other side of the fourth movable partition. The example can include a second manifold, with each of the third and fourth accumulators coupled to the second manifold, the second manifold defining a second passage in selectively valved fluid communication with the gas of the third accumulator and the fourth accumulator, the second manifold defining a third movable partition port in selectively valved fluid communication with the gas of the first and third accumulator, and a fourth movable partition port in selectively valved fluid communication with the gas of the second and fourth accumulator.

Example 80 can include, or can optionally be combined with the subject matter of Example 79, including storing energy, by powering a first motor to compress a gas into a first tank. The example can include powering a first pump and pumping a hydraulic fluid out of a first accumulator and drawing the gas out of the first tank and into the first accumulator. The example can include with the first pump, compressing the hydraulic fluid into a second accumulator, displacing a second portion of the gas out of the second accumulator and into a third accumulator. The example can include powering a second pump and pumping a second portion of the hydraulic fluid out of the third accumulator and drawing the gas out of the second accumulator and into the third accumulator. The example can include with the second pump, compressing the second portion of hydraulic fluid into a fourth accumulator, displacing a third portion of the gas out of the second accumulator and into a second tank.

Example 81 can include, or can optionally be combined with the subject matter of Example 80, comprising releasing energy, by releasing the third portion of gas from the second tank into the fourth accumulator and displacing the second portion of hydraulic fluid out of the fourth accumulator. The example can include powering the second pump as a motor with the second portion of hydraulic fluid and draining the second portion hydraulic fluid into the third accumulator. The example can include releasing the second portion of gas from the third accumulator into the second accumulator and displacing the first portion of gas out of the second accumulator. The example can include powering the first pump as a motor with the first portion of hydraulic fluid and draining the first portion of hydraulic fluid into the first accumulator.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and documents so incorporated by reference, the usage in this document controls.

In this document, the terms "a" or "an" are used as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Examples such as method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

This detailed description of the present invention refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment.

This detailed description is, therefore, not to be taken in a limiting sense, and the scope is defined only by the appended claims, along with the full scope of legal equivalents to which such claims are entitled.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. An apparatus, comprising:
   a vessel defining at least one vessel port extending from an interior of the vessel to an exterior of the vessel;
   a moveable partition disposed in the vessel and sealed around the vessel port, partitioning a vessel interior into a vessel port side and a mandrel side;
   a mandrel disposed in the vessel in the mandrel side of the interior of the vessel and defining at least one mandrel port extending from the interior of the vessel to an exterior of the, wherein the moveable partition is configured to flex against the mandrel; and
   cooling channels disposed through the mandrel, sealed from the interior of the vessel.

2. The apparatus of claim 1, wherein the movable partition comprises a piston slideable in a corresponding accumulator.

3. The apparatus of claim 2, wherein the piston includes a frustoconical piston, and the accumulator includes a frustoconical recess sized and shaped to dispose a gap between the accumulator and the piston.

4. The apparatus of claim 1, wherein the movable partition comprises a flexible diaphragm fixed to the accumulator.

5. The apparatus of claim 1, wherein at least one movable partition comprises a frustoconical piston slideable in a corresponding accumulator and the corresponding accumulator includes a frustoconical recess sized and shaped to conform to the frustoconical piston to receive the piston.

6. The apparatus of claim 1, wherein the vessel is one of a plurality of vessels, each including a corresponding mandrel, with at least two vessels sharing a common dividing wall.

7. An apparatus, comprising:
   a shell defining a plurality of interior volumes, with a respective hydraulic port extending from a respective interior of the volume to a respective exterior of the shell, and a respective pneumatic port extending from the respective interior of the volume to the respective exterior of the shell, wherein the plurality of volumes are divided by at least one common dividing wall including a fluid cooling port disposed through the at least one common dividing wall; and
   a respective moveable partition disposed in each of the volumes, with each moveable partition sealed around a respective hydraulic port , partitioning the respective volume interior into a respective hydraulic port side and a respective pneumatic port side, wherein a plurality of hydraulic ports are in fluid communication, configured to commute a pressure on one side of the common dividing wall to an opposite side of the common dividing wall.

8. The apparatus of claim 7, wherein the plurality of volumes are hexagonal in cross-section, interlocking with one another in a honeycomb configuration.

9. The apparatus of claim 7, wherein at least one moveable partition includes a bladder.

10. The apparatus of claim 9, wherein shell has a top and a bottom opposite the top, with the at least one common dividing wall extending between the top and the bottom, and wherein a hydraulic port is disposed through the bottom of the shell and is in fluid communication with an interior of the bladder at a bottom portion of the bladder, with a top portion of the bladder coupled to the top of the shell, wherein the respective pneumatic port in fluid communication with an exterior of the bladder is one of a plurality of ports in fluid communication with one another.

11. The apparatus of claim 7, wherein a plurality of hydraulic ports are in fluid communication via a manifold.

* * * * *